(12) United States Patent
Spiro

(10) Patent No.: US 11,304,390 B2
(45) Date of Patent: Apr. 19, 2022

(54) AUTOMATED VERTICAL PLANT CULTIVATION SYSTEM

(71) Applicant: Daniel S. Spiro, Scottsdale, AZ (US)

(72) Inventor: Daniel S. Spiro, Scottsdale, AZ (US)

(73) Assignee: URBAN PLANTER, LLC, Scottsdale, AZ (US)

( * ) Notice: Subject to any disclaimer, the term of this patent is extended or adjusted under 35 U.S.C. 154(b) by 673 days.

(21) Appl. No.: 15/885,157

(22) Filed: Jan. 31, 2018

(65) Prior Publication Data

US 2018/0317411 A1  Nov. 8, 2018

Related U.S. Application Data

(63) Continuation-in-part of application No. 15/589,845, filed on May 8, 2017, now Pat. No. 10,524,433.

(51) Int. Cl.
*A01G 31/06* (2006.01)
*A01G 9/02* (2018.01)
*A01G 7/04* (2006.01)

(52) U.S. Cl.
CPC ............ *A01G 31/06* (2013.01); *A01G 7/045* (2013.01); *A01G 9/023* (2013.01)

(58) Field of Classification Search
CPC .......... A01G 31/06; A01G 7/045; A01G 7/00; A01G 9/02; A01G 9/022; A01G 9/023; A01G 9/024; A01G 31/00
See application file for complete search history.

(56) References Cited

U.S. PATENT DOCUMENTS

| 1,560,436 | A | | 11/1925 | Staples |
| 2,723,341 | A | * | 11/1955 | Greenspan ............... A47G 7/06 |
| | | | | 362/154 |
| 4,295,296 | A | | 10/1981 | Kinghorn |
| 4,845,602 | A | | 7/1989 | Lehocki |

(Continued)

FOREIGN PATENT DOCUMENTS

| CN | 104584924 | 5/2015 |
| GN | 103416292 | 12/2013 |

(Continued)

OTHER PUBLICATIONS

Spiro, Daniel, "Automated Vertical Plant Cultivation System," EP Application No. 19214341.0, Extended European Search Report dated May 6, 2020.

*Primary Examiner* — Thanh Pham
(74) *Attorney, Agent, or Firm* — Barnes & Thornburg LLP; Michael A. Carrillo

(57) ABSTRACT

An automated plant cultivation system is provided having multi-tiered vertically arranged horizontal magazine structures each employing seed or plant capsules with a fluid circulation and illumination and communication network controlled by an on-board processor. Particularly, the system includes a magazine structure having seed/plant capsules within seed/plant reservoirs alternately arranged between at least one of a light source substantially concealed from direct viewing. A fluid channel extends across a long axis of the magazine structure, wherein the magazine structure is adapted for use of seed/plant capsules with nutrient composite plant growth cultivation, hydroponic plant growth cultivation, aeroponic plant growth cultivation methods or combinations thereof.

18 Claims, 17 Drawing Sheets

(56) References Cited

U.S. PATENT DOCUMENTS

| | | | |
|---|---|---|---|
| 5,454,187 A * | 10/1995 | Wasserman | A01G 7/045 47/39 |
| 5,524,387 A | 6/1996 | Whisenant | |
| 6,061,957 A | 5/2000 | Takashima | |
| 6,076,940 A * | 6/2000 | Sanford, Jr. | A01G 9/02 362/122 |
| 6,105,309 A | 8/2000 | Takayanagi | |
| 6,536,159 B1 | 3/2003 | Van Den Ende | |
| 8,864,331 B2 * | 10/2014 | Kalb | F21V 33/0028 362/154 |
| 2004/0110279 A1 | 6/2004 | Everett | |
| 2007/0104841 A1 * | 5/2007 | Min | A23L 3/36 426/248 |
| 2007/0199241 A1 | 8/2007 | Peleszezak | |
| 2008/0092442 A1 | 4/2008 | Singer | |
| 2008/0222949 A1 | 9/2008 | Bissonnette | |
| 2010/0146854 A1 | 6/2010 | Cannon | |
| 2011/0000807 A1 * | 1/2011 | Snelten | B65D 85/52 206/423 |
| 2011/0219689 A1 | 9/2011 | Hodson-Walker | |
| 2011/0258927 A1 * | 10/2011 | Carter | A01G 13/0268 47/66.7 |
| 2012/0000128 A1 * | 1/2012 | Rochefort | A01G 31/02 47/62 R |
| 2013/0294065 A1 | 11/2013 | Wells | |
| 2014/0000162 A1 | 1/2014 | Blank | |
| 2014/0026482 A1 * | 1/2014 | Nell, Jr. | A01G 31/02 47/62 R |
| 2014/0318012 A1 | 10/2014 | Fujiyama | |
| 2015/0000191 A1 | 1/2015 | Nagadome | |
| 2015/0230409 A1 * | 8/2015 | Nicole | H05B 45/10 47/17 |
| 2016/0014974 A1 * | 1/2016 | Grajcar | H05B 45/20 47/58.1 LS |
| 2016/0037737 A1 | 2/2016 | Fingerle | |
| 2016/0128288 A1 * | 5/2016 | Pettinelli | A01G 31/02 47/62 N |
| 2016/0135395 A1 | 5/2016 | Umpstead | |
| 2016/0192606 A1 | 7/2016 | Karbowski | |
| 2016/0205739 A1 * | 7/2016 | Grajcar | H05B 45/46 315/210 |
| 2016/0316645 A1 | 11/2016 | Neufeld | |
| 2016/0316646 A1 * | 11/2016 | Lepp | A01G 31/06 |
| 2016/0345518 A1 | 12/2016 | Collier | |
| 2016/0360712 A1 | 12/2016 | Yorio | |
| 2017/0071143 A1 | 3/2017 | Newsam | |
| 2017/0202156 A1 * | 7/2017 | Harms | C25B 15/08 |
| 2017/0202164 A1 | 7/2017 | Dufresne | |
| 2018/0042191 A1 * | 2/2018 | Blackburn | A01G 9/028 |
| 2018/0168108 A1 * | 6/2018 | Foreman | A01G 22/00 |

FOREIGN PATENT DOCUMENTS

| | | |
|---|---|---|
| JP | 2016539662 | 12/2016 |
| KR | 20120015684 | 2/2012 |
| KR | 20120042304 | 5/2012 |

* cited by examiner

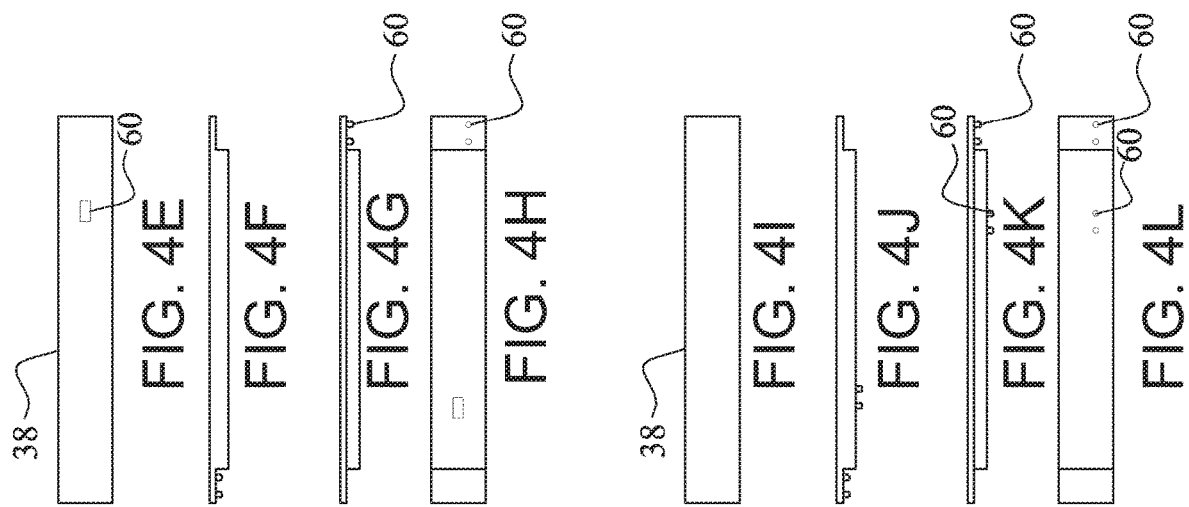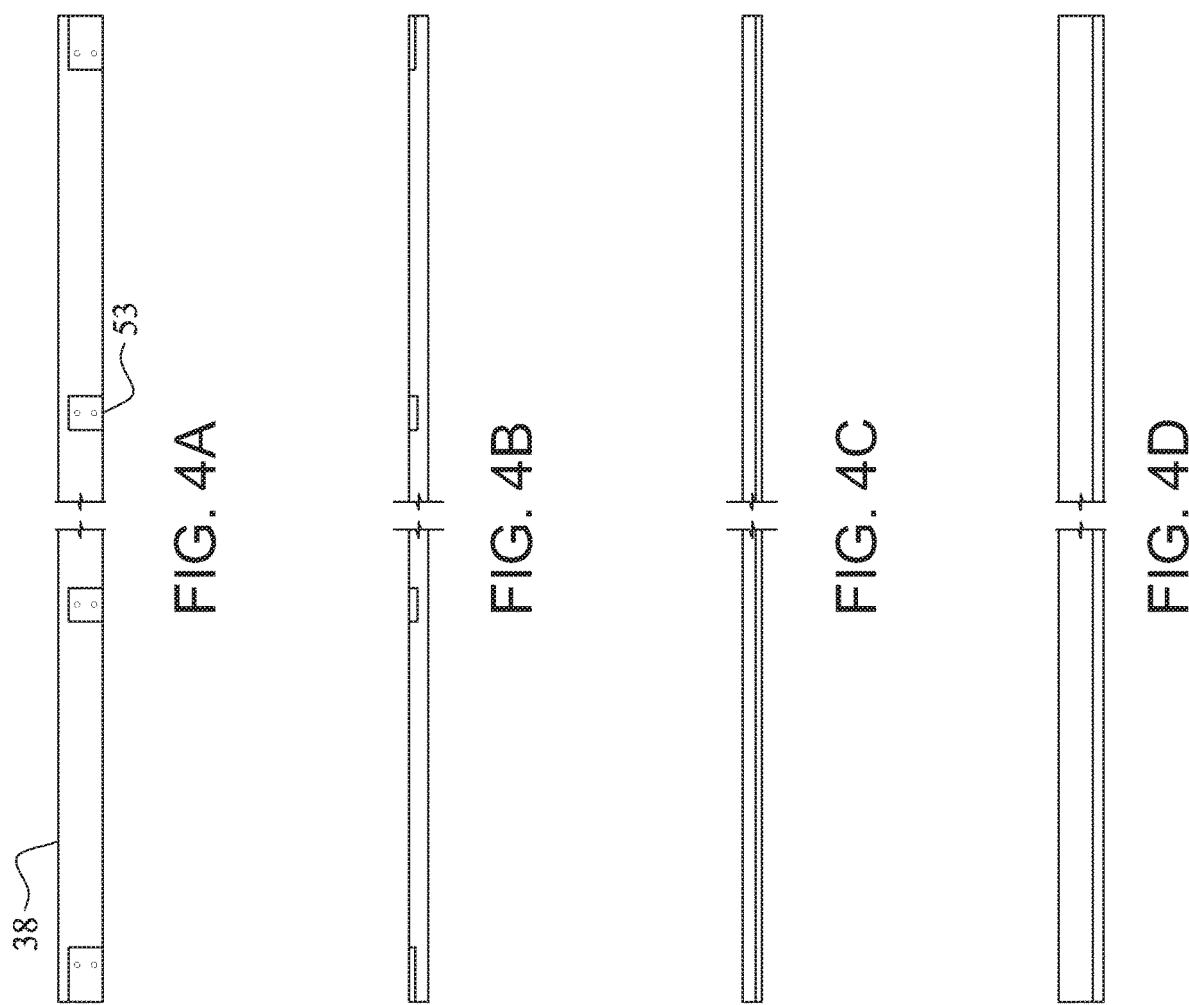

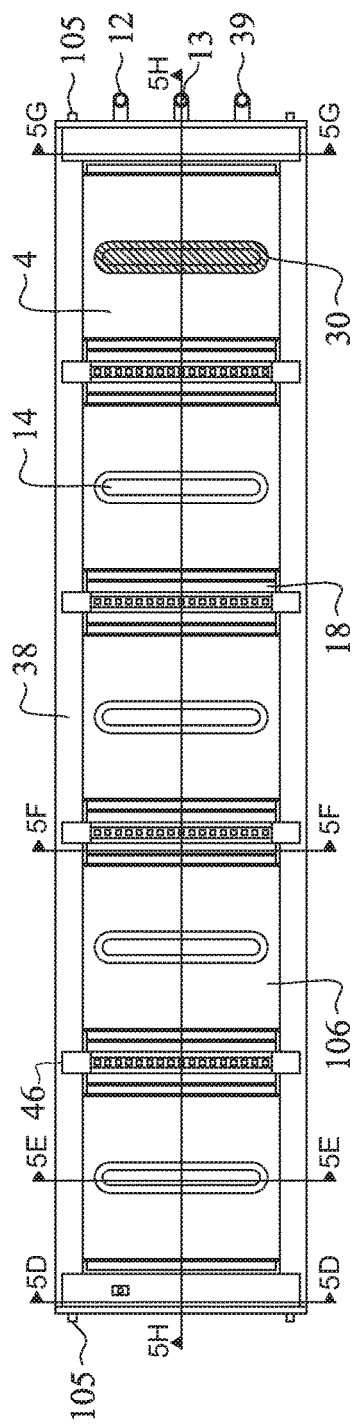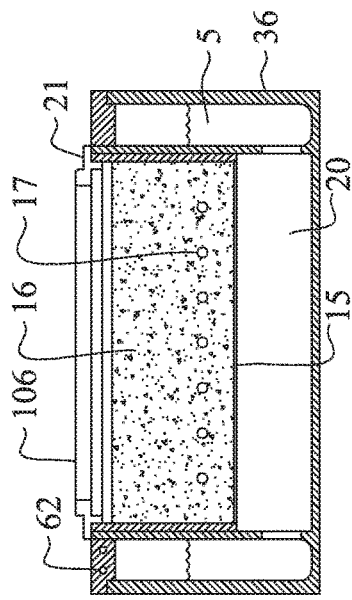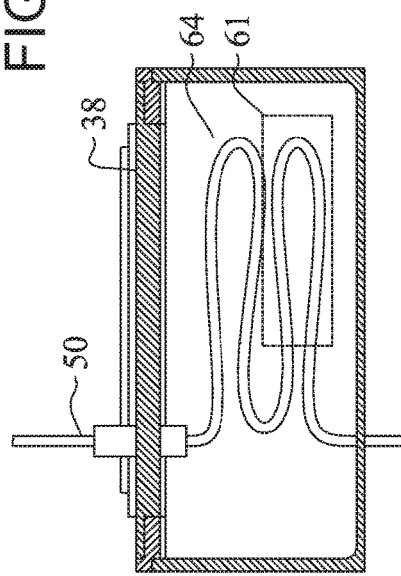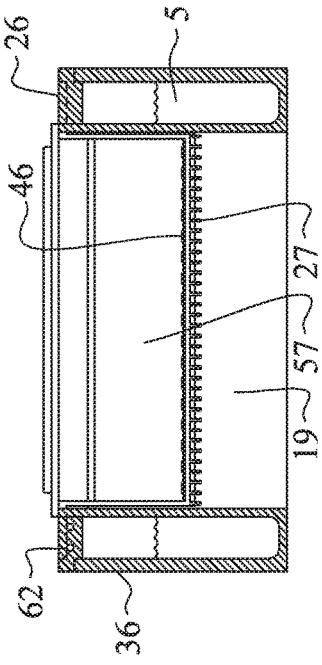

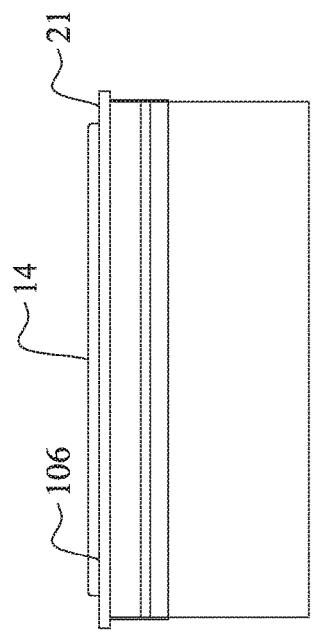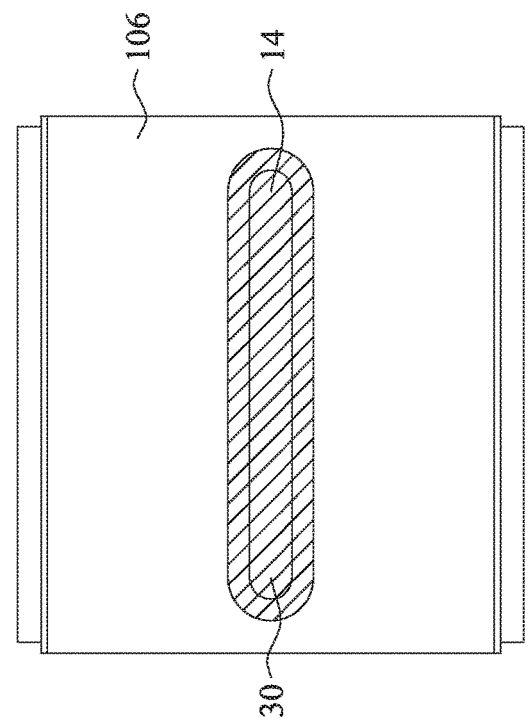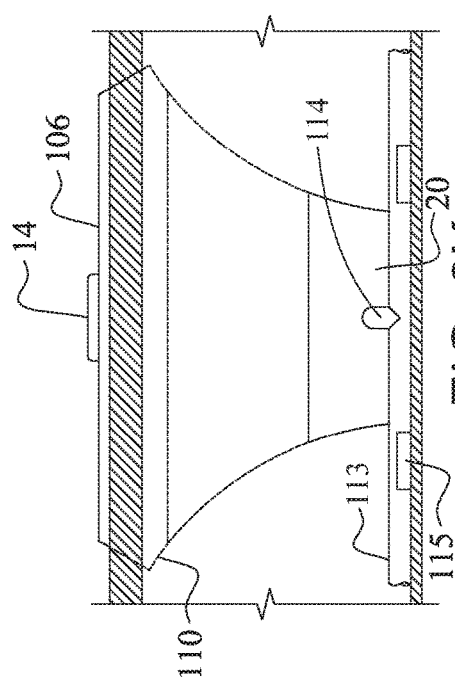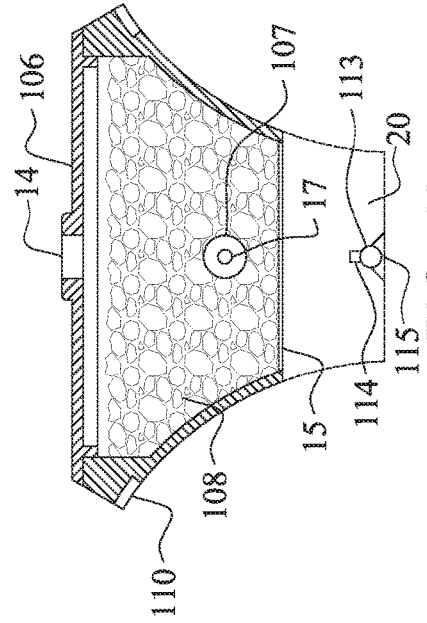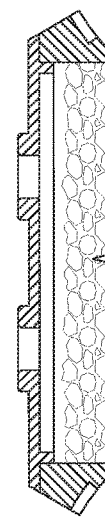

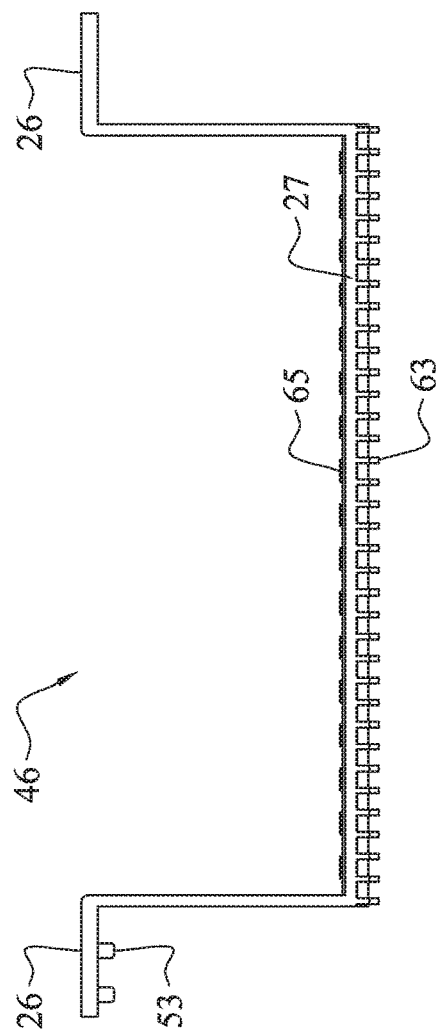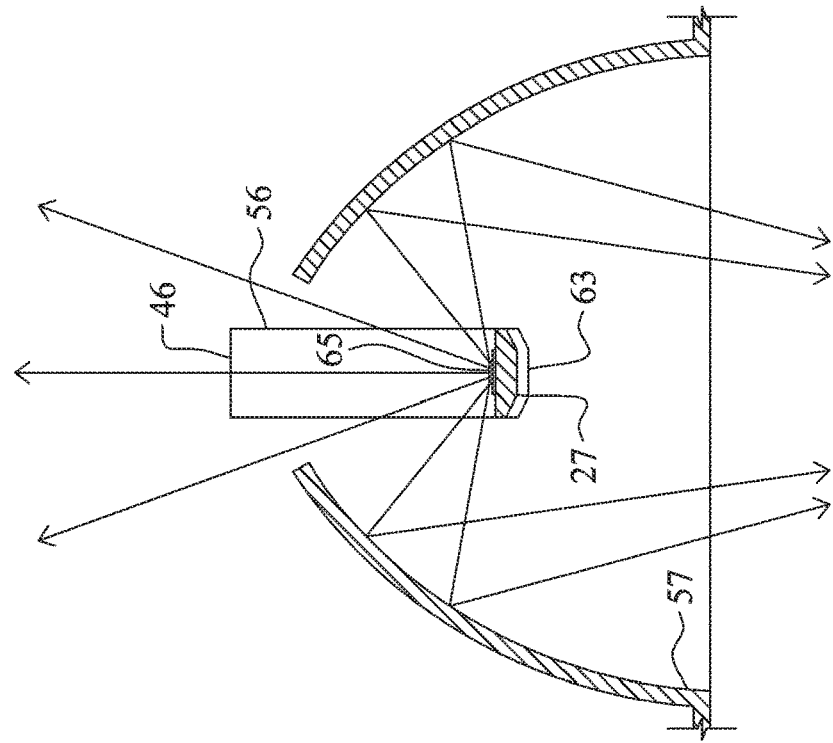

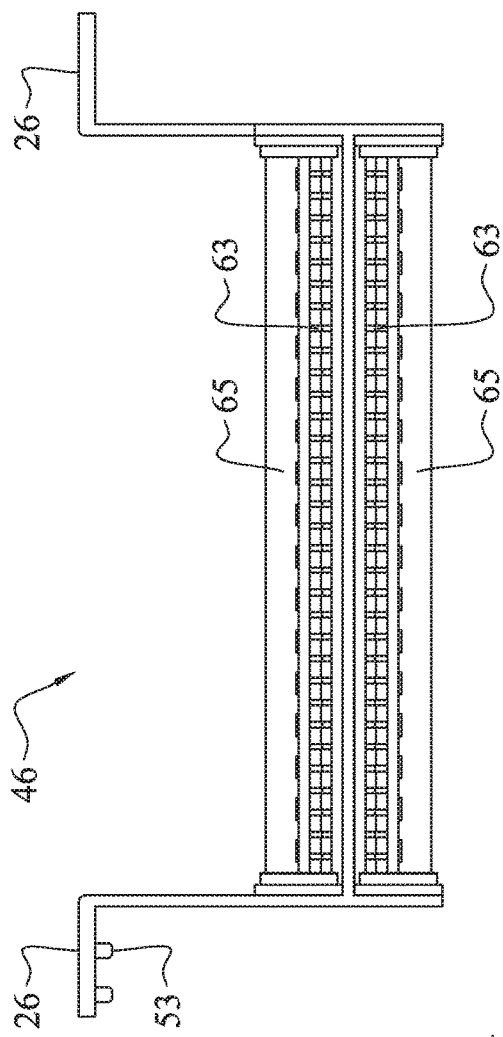
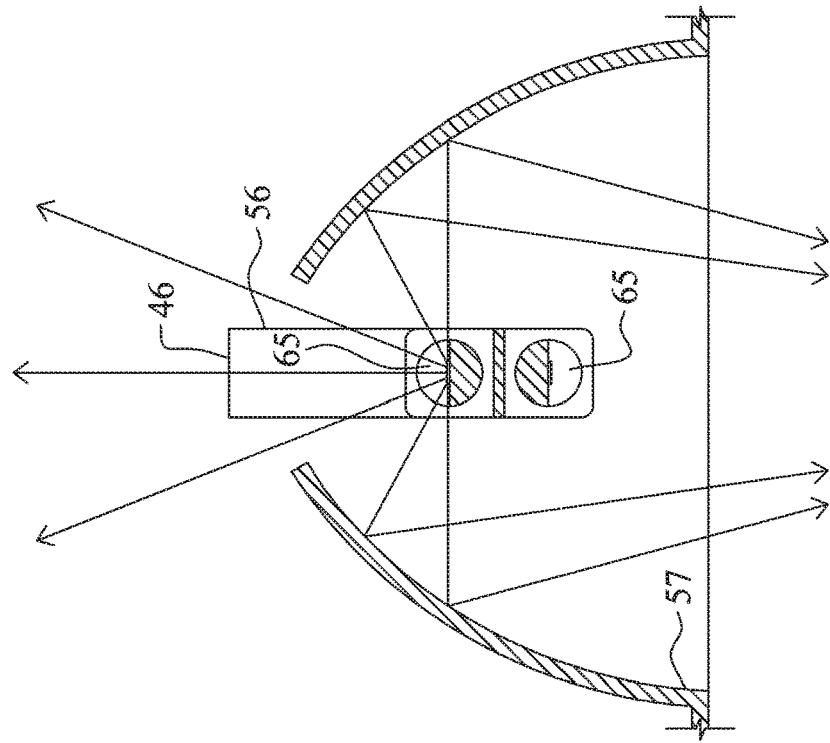
FIG. 7D
FIG. 7C

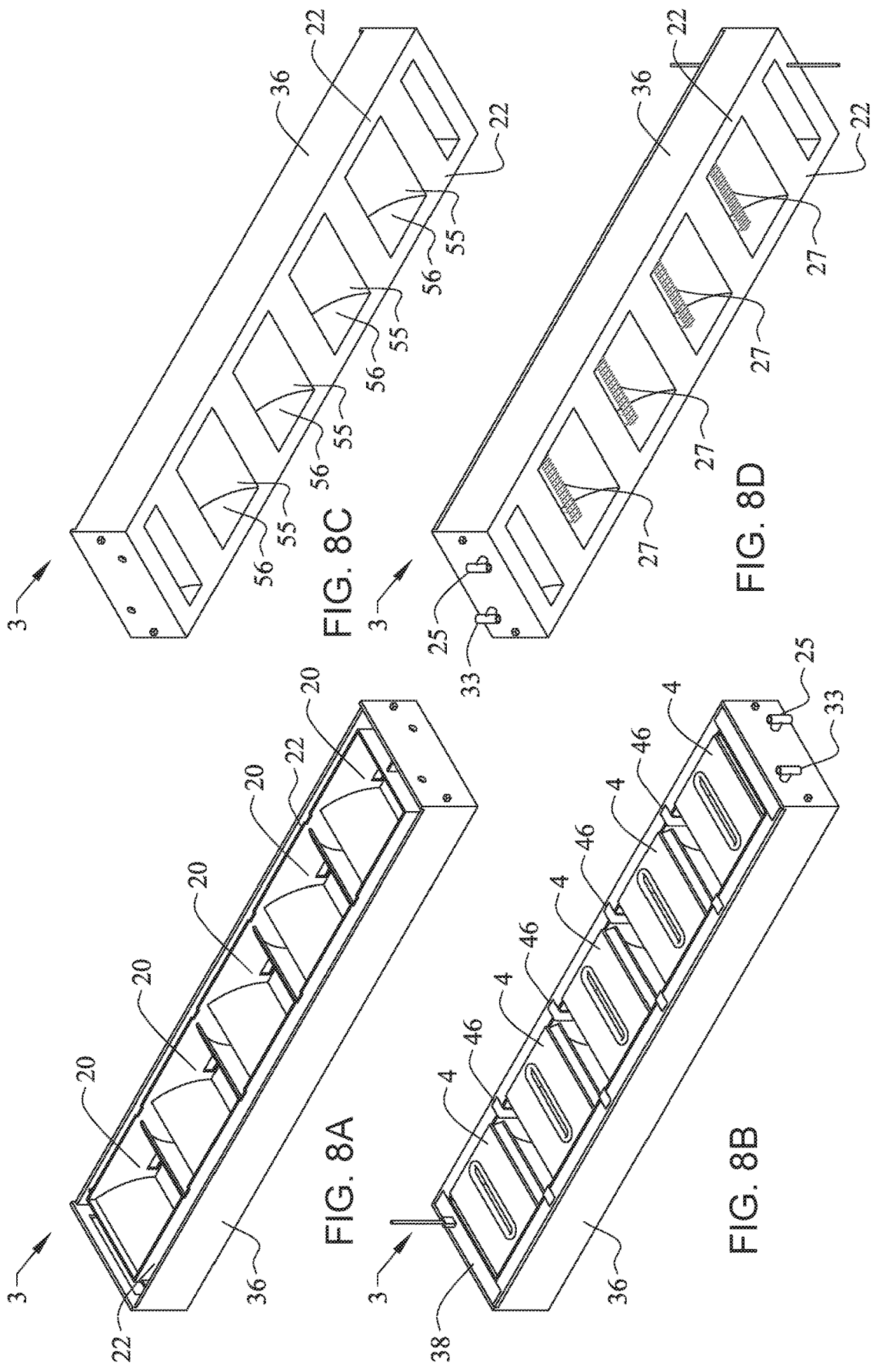

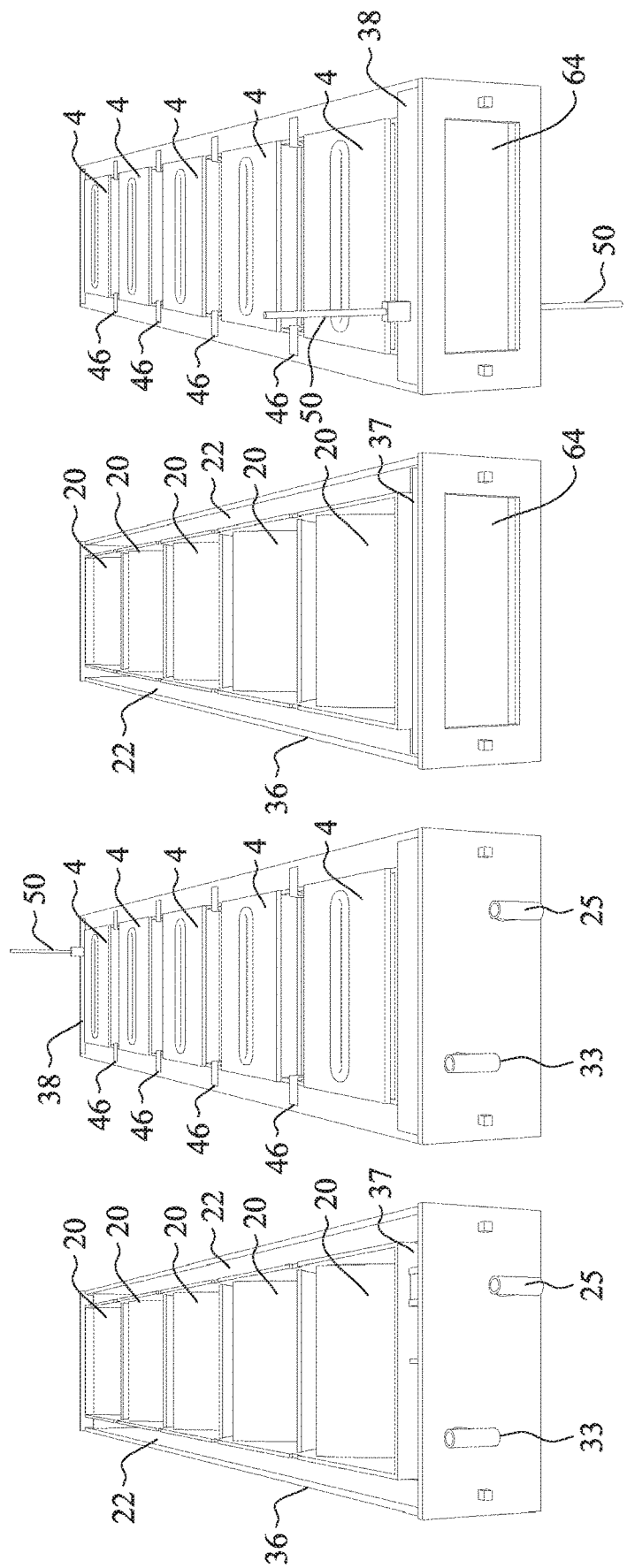

AUTOMATED VERTICAL PLANT CULTIVATION SYSTEM

CROSS REFERENCE TO RELATED APPLICATION[S]

This application is a continuation-in-part of the earlier U.S. Utility patent entitled "ATUOMATED VERTICAL PLANT CULTIVATION SYSTEM," Ser. No. 15/589,845, filed May 8, 2017, and this application also claims priority to U.S. Provisional Patent Application Ser. No. 62/592,246, filed Nov. 29, 2017, the disclosures of which are hereby incorporated entirely herein by reference.

BACKGROUND OF THE INVENTION

Technical Field

This invention relates generally to a plant cultivation system and more particularly an automated plant cultivation system having multi-tiered vertically arranged horizontal structures each employing seed or plant capsules with a fluid circulation and illumination and communication network controlled by an on-board processor.

State of the Art

In urban environments, smart space utilization is key to reducing home and office costs. The 21st century electronic technologies have had a profound impact on design concepts applied to furniture/appliance placement in interiors. Present day interior electronic devices are slimline, compact, multifunctional and network designed to optimize floor and wall space. Device connectivity via the internet results in less dependency on printed material, further clearing floor and wall space previously taken up by bookcases.

As technological advances have changed design practices, indoor appliances and furniture, they have also isolated us from nature. While outdoor garden and parks are common in urban environments, a feature appreciated by all, indoor space for gardens in urban settings has thus far been the privilege of only the wealthy. The advent of the internet of things ("IoT") governed by resident intelligence now makes indoor horticulture affordable to all. Historic technological obstacles which stood in the way of home and office plant cultivation, including soil, moisture, lighting, insects, fungi, molds, algae, and odor control, have been overcome. Now, technology has made indoor plant cultivation not only possible, but also affordable for most people.

DISCLOSURE OF THE INVENTION

The present invention relates to an automated plant cultivation system having multi-tiered vertically arranged horizontal structures each employing seed or plant capsules with a fluid circulation and illumination and communication network controlled by an on-board processor.

An embodiment includes an automated vertical plant cultivation system comprising: a magazine structure for plant cultivation comprising: at least one fluid channel; a light source with a reflector aperture substantially concealing the light source from direct view; and at least two seed/plant reservoirs, each seed/plant reservoir retaining a seed/plant capsule, wherein the fluid channel extends across the light source aperture and each seed/plant reservoir allowing fluid into said reservoirs.

Another embodiment includes an automated vertical plant cultivation system comprising a magazine structure having: seed/plant capsules within seed/plant reservoirs alternately arranged between at least one of a light source substantially concealed from direct viewing; a fluid channel extend across a long axis of the magazine structure, wherein the magazine structure is adapted for use of seed/plant capsules with nutrient composite plant growth cultivation, hydroponic plant growth cultivation, aeroponic plant growth cultivation methods or combinations thereof.

Further, another embodiment includes an automated vertical plant cultivation system comprising: a magazine structure comprising: at least one seed/plant capsule fluid reservoir; a fluid channel; and a light source, wherein the seed/plant reservoir has an inner wall for containing fluid and an outer wall that is a light reflector.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4A is a top view of a fluid channel cover of a magazine structure of an automated vertical plant cultivation system, in accordance with embodiments;

FIG. 4B is a first side view of a fluid channel cover of a magazine structure of an automated vertical plant cultivation system, in accordance with embodiments;

FIG. 4C is a second side view of a fluid channel cover of a magazine structure of an automated vertical plant cultivation system, in accordance with embodiments;

FIG. 4D is a bottom view of a fluid channel cover of a magazine structure of an automated vertical plant cultivation system, in accordance with embodiments;

FIG. 4E is a top view of a first end fluid channel cover of a magazine structure of an automated vertical plant cultivation system, in accordance with embodiments;

FIG. 4F is a first side view of a first end fluid channel cover of a magazine structure of an automated vertical plant cultivation system, in accordance with embodiments;

FIG. 4G is a second side view of a first end fluid channel cover of a magazine structure of an automated vertical plant cultivation system, in accordance with embodiments;

FIG. 4H is a bottom view of a first end fluid channel cover of a magazine structure of an automated vertical plant cultivation system, in accordance with embodiments;

FIG. 4I is a top view of a second end fluid channel cover of a magazine structure of an automated vertical plant cultivation system, in accordance with embodiments;

FIG. 4J is a first side view of a second end fluid channel cover of a magazine structure of an automated vertical plant cultivation system, in accordance with embodiments;

FIG. 4K is a second side view of a second end fluid channel cover of a magazine structure of an automated vertical plant cultivation system, in accordance with embodiments;

FIG. 4L is a bottom view of a second end fluid channel cover of a magazine structure of an automated vertical plant cultivation system, in accordance with embodiments;

FIG. 5C is a top view of a magazine structure of an automated vertical plant cultivation system, in accordance with embodiments;

FIG. 5D is a section view of the magazine structure of FIG. 5C taken along line 5D-5D, in accordance with embodiments;

FIG. 5E is a section view of the magazine structure of FIG. 5C taken along line 5E-5E, in accordance with embodiments;

FIG. 5F is a section view of the magazine structure of FIG. 5C taken along line 5F-5F, in accordance with embodiments;

FIG. 5G is a section view of the magazine structure of FIG. 5C taken along line 5G-5G, in accordance with embodiments;

FIG. 6K is a side view of an aeroponics seed/plant capsule for use in an automated vertical plant cultivation system, in accordance with embodiments;

FIG. 6L is a section side view of an aeroponics seed/plant capsule for use in an automated vertical plant cultivation system, in accordance with embodiments;

FIG. 6M is a section side view of a portion of an aeroponics seed/plant capsule for use in an automated vertical plant cultivation system, in accordance with embodiments;

FIG. 6N is a side view of an aeroponics seed/plant capsule for use in an automated vertical plant cultivation system, in accordance with embodiments;

FIG. 6O is a top view of an aeroponics seed/plant capsule for use in an automated vertical plant cultivation system, in accordance with embodiments;

FIG. 7A is a section view of a lighting device of an automated vertical plant cultivation system, in accordance with embodiments;

FIG. 7B is a side view of a lighting device of an automated vertical plant cultivation system, in accordance with embodiments;

FIG. 7C is a section view of another lighting device of an automated vertical plant cultivation system, in accordance with embodiments;

FIG. 7D is a side view of a lighting device of an automated vertical plant cultivation system, in accordance with embodiments;

FIG. 8A is a perspective view of a magazine structure of an automated vertical plant cultivation system, in accordance with embodiments;

FIG. 8B is a perspective view of a magazine structure of an automated vertical plant cultivation system, in accordance with embodiments;

FIG. 8C is a perspective view of a magazine structure of an automated vertical plant cultivation system, in accordance with embodiments;

FIG. 8D is a perspective view of a magazine structure of an automated vertical plant cultivation system, in accordance with embodiments;

FIG. 11A is a perspective view of a magazine structure of an automated vertical plant cultivation system, in accordance with embodiments;

FIG. 11B is a perspective view of a magazine structure of an automated vertical plant cultivation system, in accordance with embodiments;

FIG. 11C is a perspective view of a magazine structure of an automated vertical plant cultivation system, in accordance with embodiments; and FIG. 11D is a perspective view of a magazine structure of an automated vertical plant cultivation system, in accordance with embodiments.

DETAILED DESCRIPTION OF EMBODIMENTS OF THE INVENTION

As discussed above, embodiments of the present invention relate to an automated plant cultivation system having multi-tiered vertically arranged horizontal structures each employing seed or plant capsules with a fluid circulation and illumination and communication network controlled by an on-board processor.

Automated Vertical Plant Cultivation System

An Automated Vertical Plant Cultivation System (200) automates indoor plant cultivation by simplifying a process otherwise requiring constant attention. The innovative design concept resolves the challenge of introducing plant material into an indoor space in an attractive manner occupying minimum space.

Figure 1A:
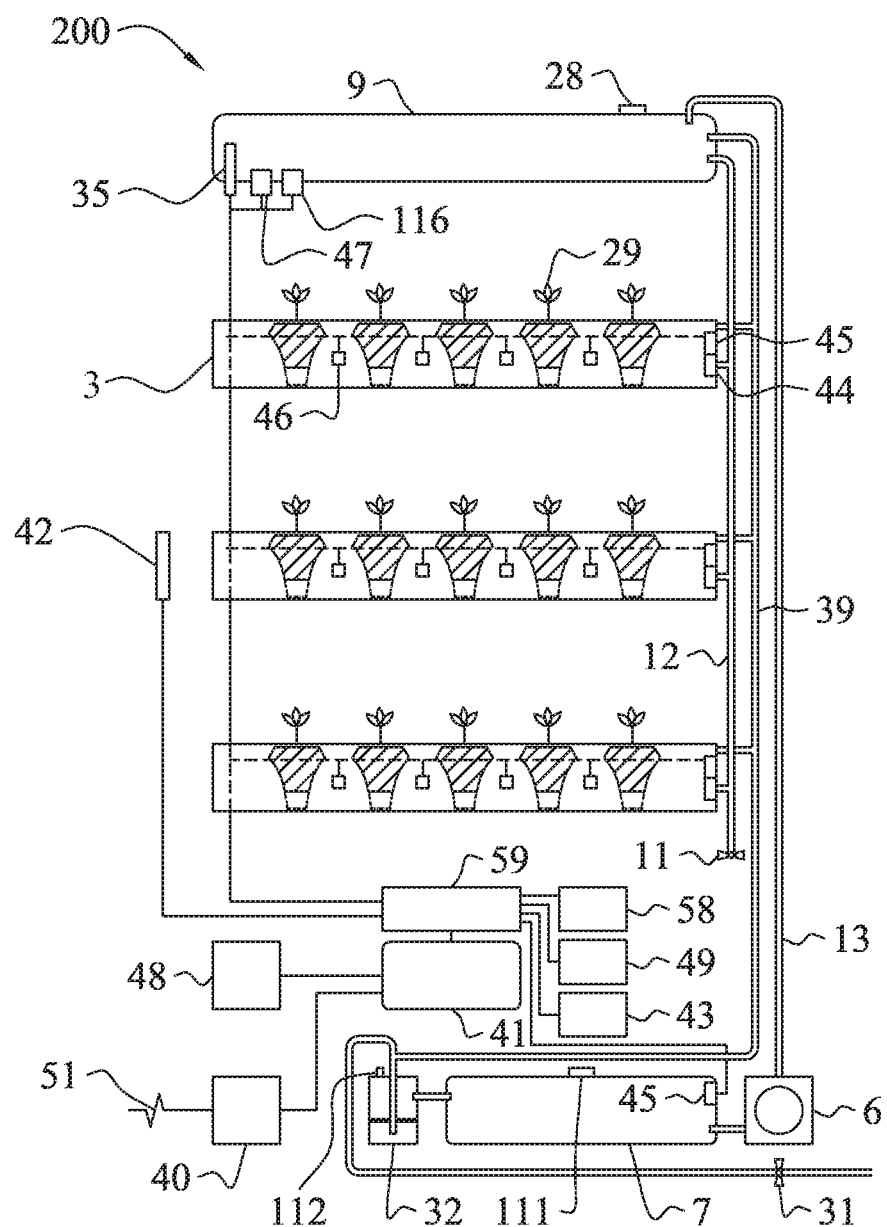
FIG. 1A is a schematic view of an automated vertical plant cultivation system, in accordance with embodiments.
Figure 1D:
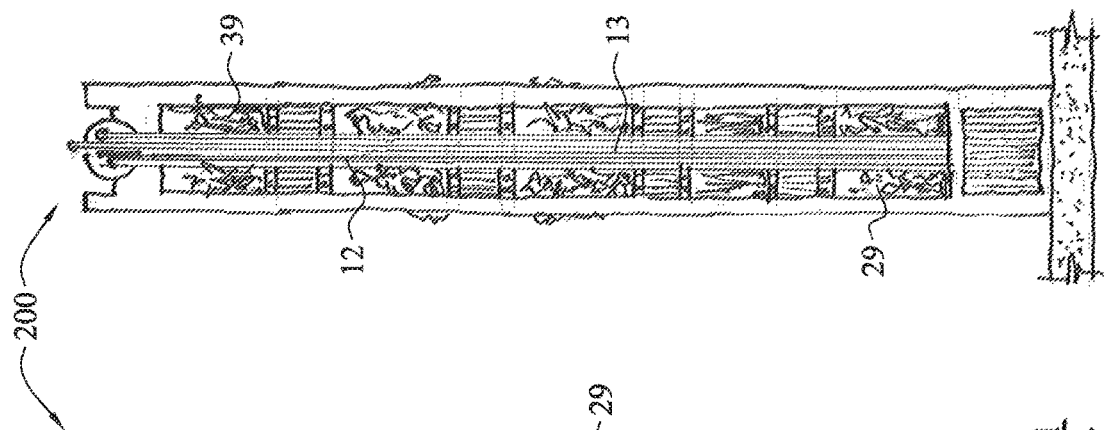
FIG. 1D is a side view of an automated vertical plant cultivation system, in accordance with embodiments.
Figure 1C:
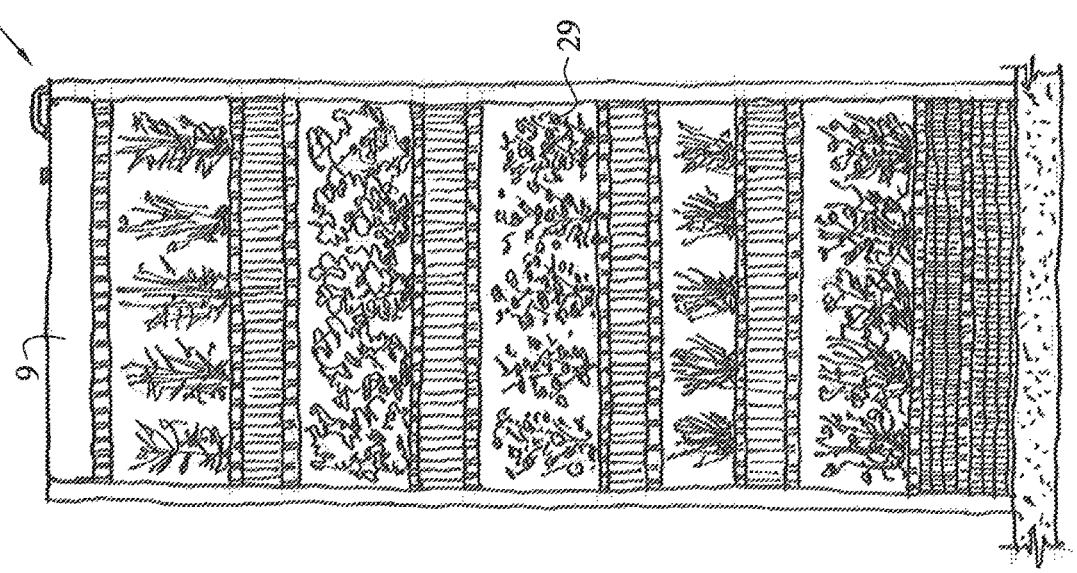
FIG. 1C is a front view of an automated vertical plant cultivation system, in accordance with embodiments.
Figure 1B:
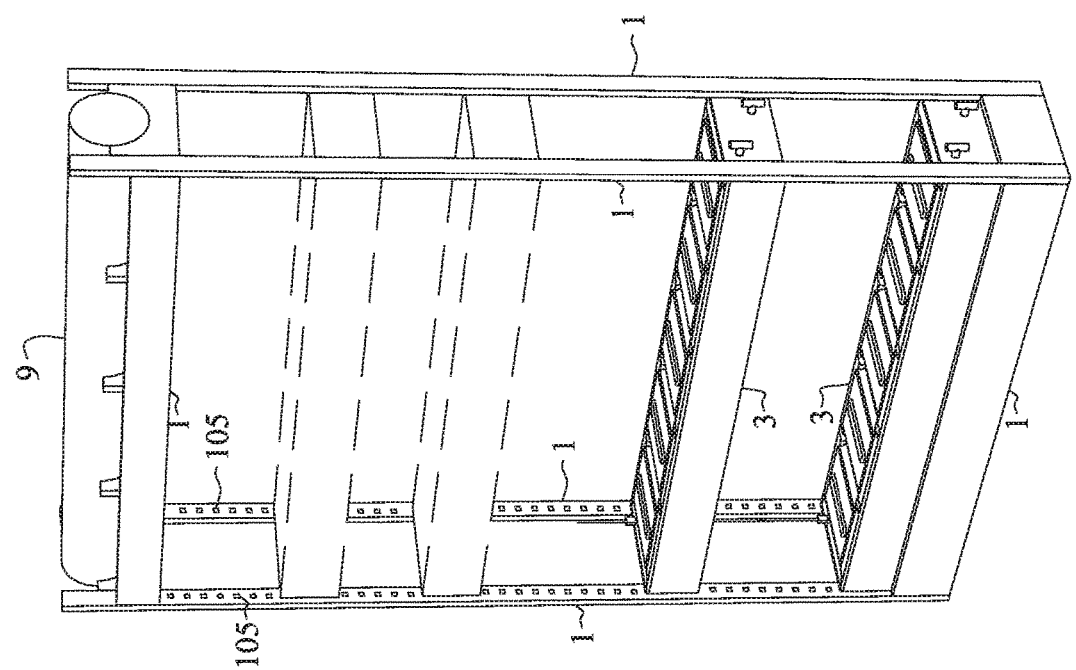
FIG. 1B is a perspective view of an automated vertical plant cultivation system, in accordance with embodiments.

FIG. 1A shows the assembly's design concept and structural frame. The concept's key element is its magazine. Prior to teaching about the magazine, an overview of the system's fluid circulatory, power and controls systems will help to understand the magazine's multilayered innovation.

Fluid Circulation System

Figure 3B:
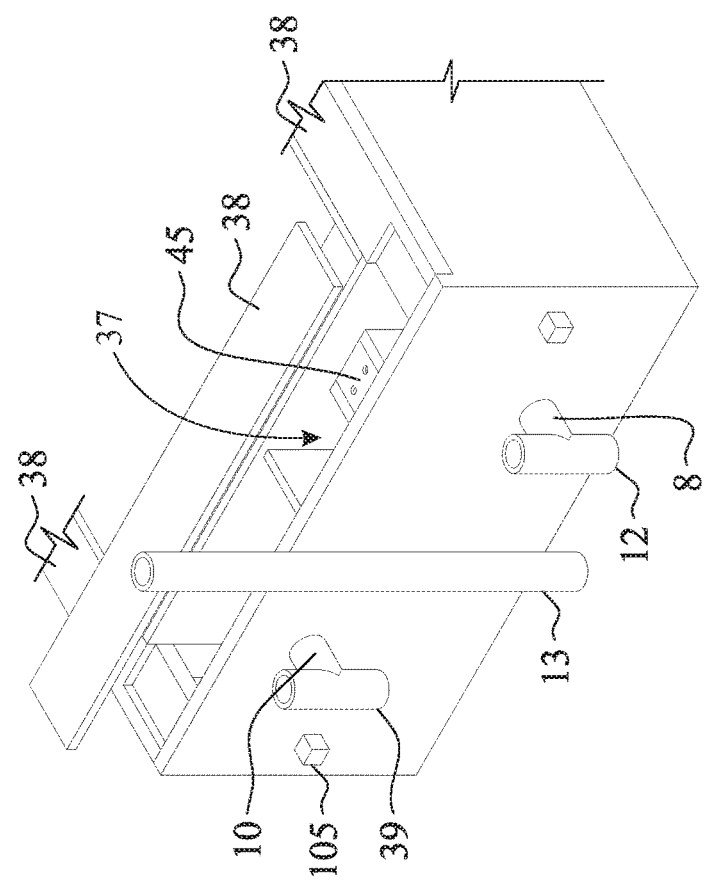
FIG. 3B is a partial perspective, partially exploded view of the fluid entry portion of a magazine structure of an automated vertical plant cultivation system, in accordance with embodiments.

FIG. 1A-1D depicts the system's fluid circulation system for seed/plant capsule (4) containing nutrient composite (16) supported by electronic devices. An inlet shut-off valve (31) passes fluid (5) to a holding/overflow tank (7) through an optional filter cup (32). An electric pump (6) lifts the fluid (5) to a gravity tank (9) elevated above magazines (3). At the gravity tank (9), the fluid (5) may be oxygenated. Also, if needed, the fluid (5) temperature may be regulated. A fluid sensor (45) in the gravity tank (9) monitors the tank's fluid level. At least one pipe (12) connects the gravity tank (9) to the plant magazine (3). Also, at least one overflow pipe (39) connects the gravity tank (9) to an overflow outlet (33) in magazine/s, an optional filter cup (32) and the overflow/holding tank (7). When fluid levels at the gravity tanks (5) exceed a set level, fluid flows through the gravity tank overflow bypass (23) directly into an optional detachable filter cup (32) and from there to the holding/overflow tank (7). The filter cup (32) collects particles in the fluid (5) and is cleaned periodically. Fluid (5) flows to each magazine (3) by gravity. At each magazine inlet (25), a valve (44) controls the volume of fluid (5) permitted to enter the magazine (3). As is with the gravity tank (9), if fluid levels exceed a set level inside the magazine (3) an overflow bypass outlet (33) releases excess fluid through the overflow pipe (39) back to the optional filter cup (32) or directly to the holding/overflow tank (7). Operation of the magazine valve (44), such as a microvalve, can be controlled by a fluid sensor (45) as shown in FIGS. 1A & 3B or by the assembly controls (41) responding to a signal from the fluid sensor (45). In both methods fluid level inside the magazine (3) is monitored. When fluid levels fall below a set level, the sensor (45) directly or indirectly via the assembly controls (41) causes the valve to open to allow fluid to reach a pre-set level. When fluid level exceeds set point level but does not reach the overflow outlet (10), it is left to be consumed by plant (29) and evaporation. When fluid (5) levels in the gravity tank (9) drop below a pre-set level, the tank's fluid sensor (35) directly or indirectly via the assembly controller opens the inlet shut-off valve (31) to allow fluid (5) to enter the holding/overflow tank (7) while activating the pump (6) forcing water into the gravity tank (9). In a different embodiment, the fluid circulation system doesn't employ a gravity tank (9) delivering fluid directly to magazine (3). Also, in a different embodiment where direct connectivity to exterior fluid outlet is not available, fluid can be poured directly or indirectly to the holding tank through an inlet.

The system's versatile fluid circulation system supported by electronic devices is capable of cultivating plants by conventional seed embedded in nutrient rich composite, hydroponic or aeroponic methods. FIGS. 1A-1D depicts the system's assembly fluid circulation system for both seed/plant capsule employing nutrient composite (FIGS. 6A-6E); a hydroponic capsule having the nutrient mixed in the fluid (FIGS. 6F-6J), and a aeroponic capsule having the nutrient mixed in the fluid (FIGS. 6K-6O). FIGS. 6F-6J depict the hydroponic seed/plant capsule in elevations and section form. The hydroponic fluid solution is poured through an inlet opening (110) above the holding/overflow tank (7) or through an inlet opening at the filter cup inlet (112).

The system is typically connected directly to the fluid access point. Where such point is not available, fluid is poured into the system assembly overflow/holding tank.

Power and Controls System

The system's fluid (5) circulation, lighting (46), sound (49), and communication (43) devices are electrically powered and governed in part or in whole by the assembly's control (41). Most or all devices' voltage is stepped down (40).

The assembly control responsibilities include but are not limited to:
  A. Managing a synchronized operation of devices.
  B. Monitoring devices and creating data sets if required.
  C. Alerting user when an assembly device experiences an anomaly.
  D. Facilitating backup power connectivity when experiencing a power shortage.
  E. Providing diagnostic and troubleshooting reports.
  F. Monitoring ambient conditions including assembly fluid temperature.

Tasked with maintaining favorable environmental conditions for plant growth, the assembly's controls (41) consist of a processor with memory that governs in part or in whole a device network consisting of communication module (43), communicating with local or local and remote devices, power distribution bus (59), a thermal probe/heater (116) lighting devices (46), a pump (6), an oxygenator (47), valves (11), a photo sensor (58), a fluid sensor (45), an optional back-up power module (48) and/or an audio module (49) and a local or remote I/O communication module (43). Input/output to and from the system's assembly control is via a local interface directly mounted to the control panel, on an easy to reach panel at the assembly walls (42) or by remote device. Alternatively, a wireless remote device may also be used or be substituted for the control interface.

The fluid sensor (45) of the fluid circulation system may include two types of sensors—a basic type of sensor sensing moisture upon contact or a sensor programmed with a fluid level range variability. The system includes valves that may be bi-directional, allowing fluid to enter at one inlet and draining fluid in a neighboring outlet. The fluid sensor (45) of the system assembly must be perfectly plumb for proper operation and not subjected to vibrations and/or fluid agitation.

Upon activation, the system assembly controls (41) query the operational status of its network devices. Once all devices are confirmed to be online and ready to be used, the fluid's circulation process begins with the fluid sensor/s (45). The sensor/s send input to the controls about fluid levels in some or all the fluid containing vessels. The controls (41) then activate the fluid circulation system.

As the circulation system comes online, the overflow/holding tank fluid level reaches a point triggering the pump (6) to lift the fluid (5) to the gravity tank (9). A sensor in the gravity tank is in communication with the pump (9) allowing fluid volume to rise to a pre-set level. As the fluid at the gravity tank reaches a pre-set point, the magazines' valves (44) open to let fluid in. Fluid flow into the magazine stops by input from the fluid sensor (45) once the fluid level reaches a pre-set point. The flow of fluid to the magazine/s may be preceded by an oxygenator (47) at the gravity tank (9) enriching the oxygen content in the fluid (5) and/or a thermal probe/heater (116) regulating the fluid (5) temperature.

Figure 3A:
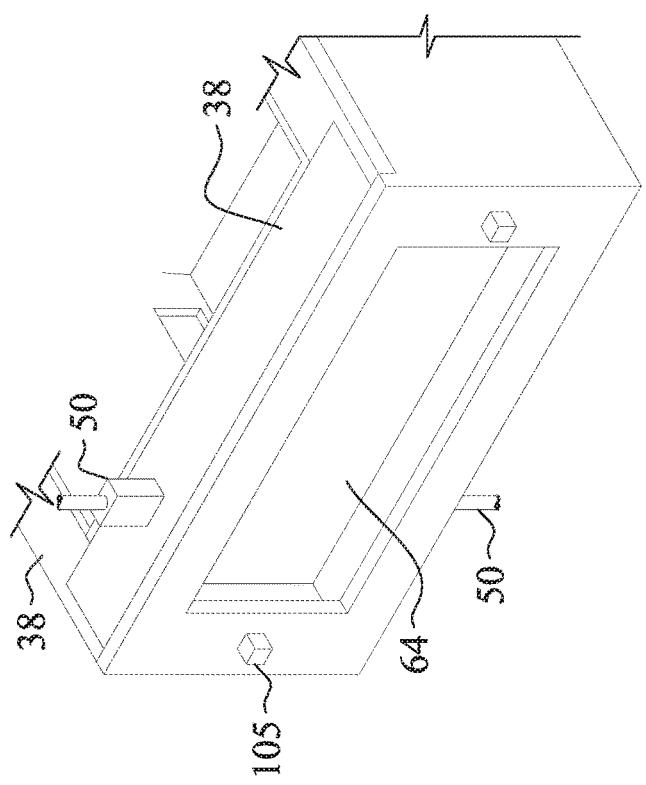
FIG. 3A is a partial perspective view of the power entry portion of a magazine structure of an automated vertical plant cultivation system, in accordance with embodiments.

FIG. 3A shows partial elevations of the magazine's power connectivity and fluid external circulation system. FIG. 3B shows the fluid inlet (8), inside the magazine's inlet reservoir (37), an inlet valve (44) which permits fluid to enter the magazine and the fluid sensor (45) abutting the valve (44). Both operate in unison to control fluid level in the magazine. Any access fluid (5) drains down to the filter cup (32) or directly into the overflow tank (7) through the magazine's overflow outlet (33). In aeroponic embodiments bi-directional valves may be used to let fluid in the magazine and then drain it out to the overflow/holding tank in a cyclical manner.

FIG. 3A shows the opposite end of the magazine's fluid inlet. This end receives power or power/data from the power/data bus conveying it to devices inside/on the magazine and downstream devices. It has a small compartment to install a power supply/modulator if needed and conceal wiring slack. Inside/on the magazine the common devices may include valve/s, sensor/s, light module/s, temperature probe and photo sensor. The power or power/data is conveyed in the magazine through fluid channel covers. FIGS. 4A-4L shows the covers with their respective power or power/data receptacles. FIGS. 4E-4H show a plug & play receptacle in the cover top and bottom faces. The power or power and data enter from below and are conveyed to the next magazine or device/s from above. Inside the cover, the power or power/data are routed to connect with the long power cover shown in FIGS. 4A-4D, also showing the lighting device receptacles (53). The cover at the opposite end to the power entry conveys power to the moisture/fluid sensor, the valve/s and to an optional temperature probe. FIGS. 4I-4L show the cover with its power/data pronged connectors to fluid sensor (45) and valve/s (44) in the fluid inlet reservoir (37).

The lighting devices (46) operate by the controller's (41) programmed schedule or can operate manually. Power enters the reflector's aperture (56) from the fluid channel cover (38). The receptacles (53) for the lighting devices (46) are located on the fluid channel cover (38). FIGS. 7A-7D shows the lighting device (46) consisting of a "U" shaped element having lateral outwardly extensions (26) on the upright legs' top end. The extensions serve as hanging points for the lighting device (46) and power or power/data connectivity point at one side. Below, a light source (65) strip, typically LED cultured onto a substrate mounted onto a heatsink (27) having fins (63) to dissipate the heat generated by the light source (65). In some embodiments, the non-powered hanger can conduct the heat into the fluid channel (22) when needed.

The light source (65) spectral distribution via the assembly controls (41) can be modulated. Such modulation can provide pleasant illumination during periods where the space is occupied, or switching to grow light spectral distribution when the space is vacant of occupants or per schedule. The light output can also be modulated with programmed pre-set output modes. The lighting device (46) is detachable, shielded from direct contact by a reflector assembly and safe from electrical shock being powered by low voltage.

System Magazine

Figure 2A:
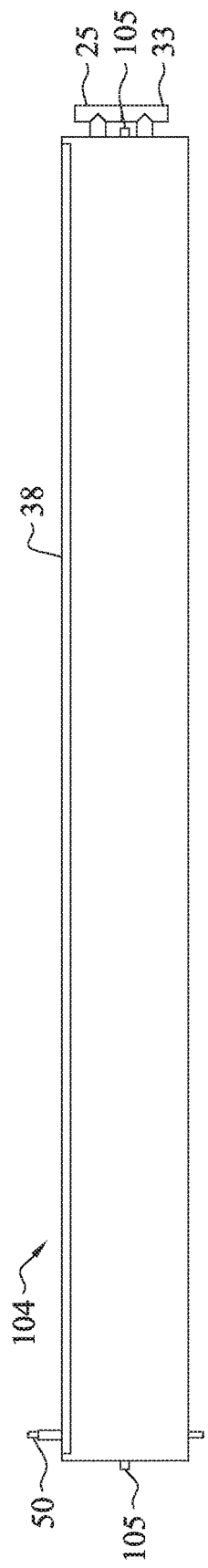
FIG. 2A is a side view of a magazine structure of an automated vertical plant cultivation system, in accordance with embodiments.
Figure 2B:
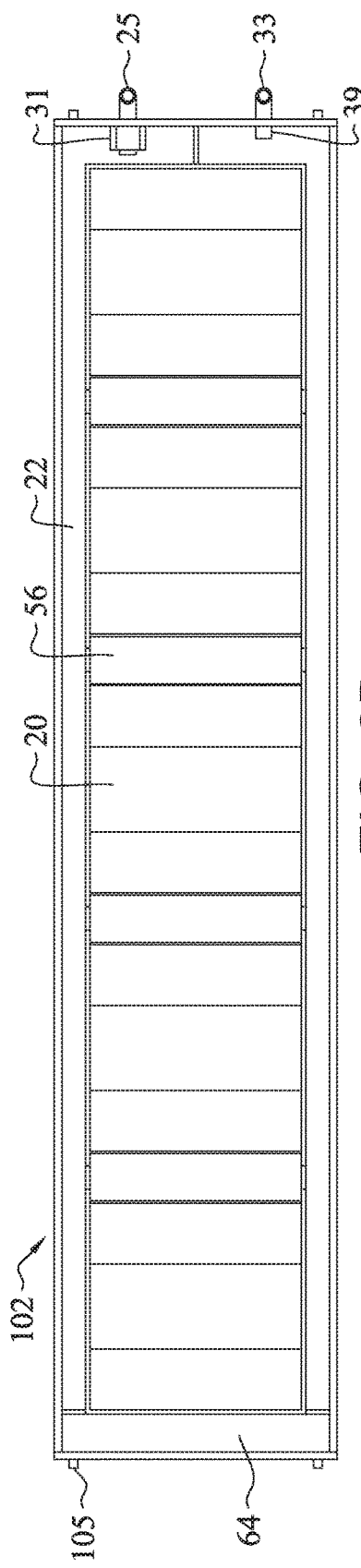
FIG. 2B is a top view of a magazine structure of an automated vertical plant cultivation system, in accordance with embodiments.
Figure 2C:
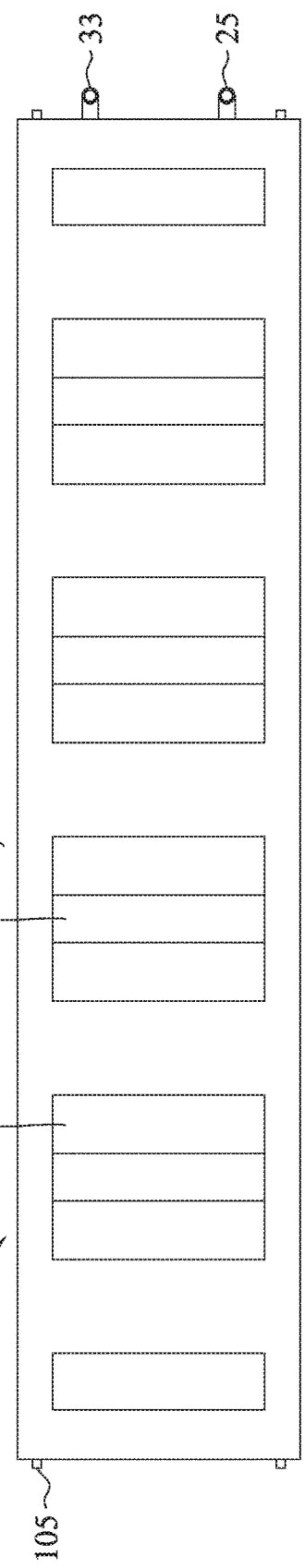
FIG. 2C is a bottom view of a magazine structure of an automated vertical plant cultivation system, in accordance with embodiments.

The magazine (3) is an embodiment providing structural support to plant material, acting as a fluid containing vessel, and providing illumination to plants, as depicted in FIGS. 2A-5M and 8A-11D. FIGS. 5A-5B shows the magazine in section, where section FIG. 5A shows the structure only and FIG. 5B shows the section structure with seed/plant capsules (4) and lighting devices (46). The magazine is commonly made of non-porous material sufficiently rigid to support its weight, seed/plant capsules (4), fluid (5), and lighting devices (46) over relatively long spans. Alternatively, the magazine may be made of non-porous materials with lining to contain fluid. The most common form of magazine (3) shown in FIGS. 2A-2C is rectangular. A rectangular magazine has at least one double wall (36) along its long axis to form the fluid channel (22) between walls. The fluid channel at the inner magazine wall (36) drain into multiple plant/seed capsule reservoirs (20). These reservoirs shown in FIGS. 5C and 5I and 8A-11D are alternately located between lighting reflector apertures (55) shown in FIGS. 7A-7D. At one of magazine's short ends FIG. 3B a valve (44) controls fluid (5) flow into the magazine (3). As fluid (5) enters the magazine (3), it flows into an inlet reservoir (37) and from there to the magazine fluid channel (22). The fluid (5) then flows to the magazine plant/seed capsule reservoir (20) maintaining an equal level at all reservoirs when magazines are horizontally plumb. A fluid sensor (45) directly or indirectly via the assembly controller (41) maintains a pre-set fluid level by controlling the valve (44) operation. The fluid sensor (45) can be integrated with the valve (44) as shown in FIG. 3B or remote at the opposite end of the magazine fluid inlet (25). The plant/seed capsules (4) inserted into the capsule reservoir (20) are immersed in the fluid (5). The fluid (5) level rises just above the seed's (17) vertical elevation placement. Aeroponic magazine embodiment shown in FIGS. 6K and 6L includes a piping network (113) with mounts (115) through the fluid channel/s leading to the plant/seed reservoir. There fluid atomizers (114) spray their mist onto the plant root. The aeroponic valve may serve as an inlet and drain valve in conjunction with the fluid pump excluding the use of the gravity tank.

The magazine's (3) fluid circulation system employs detachable fluid channel covers (38) to protect the circulation system from contamination, harboring insects and evaporation. When a seed capsule is not used, a cover (106) provides equal protection. A light aperture opening cover (117) is used where no light device is used or there is no need for up-lighting.

FIGS. 5A-5M and FIG. 7A-7D and FIGS. 8A-11D show how the lighting devices are integrated into the magazine's architecture. The magazine's lighting devices (46) are located between the plant/seed capsule reservoirs (20). These devices (46) are substantially concealed from direct viewing by reflector apertures (55) which also acts as the exterior wall of the plant/seed capsule reservoir (21). The reflector's short ends are abutting the magazine's fluid channel (22) walls. Power flows to the lighting devices through conductors embedded in the fluid channel cover (38). The lighting device rests on the channel cover at both sides of the magazine and plug-in prongs at one side engage a corresponding receptacle on the top surface of the fluid channel cover.

FIGS. 7A-7D and 8A-11D shows the reflector aperture partly open at is apex. Hung from both ends, the lighting device light source (65) is optimally located inside the reflector (55) to cast illumination upwardly and downwardly. The opening at the reflector's (55) apex permits direct light to illuminate the bottom of the plant (29) canopy. The enclosed portion of the reflector (55) having reflective surface (57), captures low angles light rays and re-directs them downwardly to top of plant (29) canopy of the magazine (3) below. The reflector (55) surface can be made partially or fully of highly reflective material.

The reflector aperture (55) confines the distribution light beam pattern to substantially fall on plant (29) material and not stray beyond. This capability is important when light spectral distribution which is harmful to human exposure is used. The light source (65) spectral wavelength can be limited to "grow light" spectral distribution only, or can also include other spectral distributions. In such settings, the light emittance can be set on a scheduler governed by the system controller.

The reflector aperture opening (56) enables air to flow from the bottom to the top of the magazine (3), cooling the lighting device and eliminating heat stratification. In addition, the lighting device's (46) un-powered hanging leg can cool the device by conducting heat into the fluid channel (22).

In another embodiment, bi-directional illumination is provided by having two light sources aimed at substantially opposite directions. FIGS. 7A-7D shows two light sources mounted on the lighting device inside the reflector, where one is aimed upwardly and the other downwardly. The same lighting device may employ at least one light source. The system may also employ a lighting device in the vicinity of the gravity tank. This device's use may include illuminating the space where the light band spectrum emulates sunlight, and is used in dark environments where occupants may develop SAD (Seasonal Affective Disorder).

System Plant/Seed Capsule

Figure 5A:
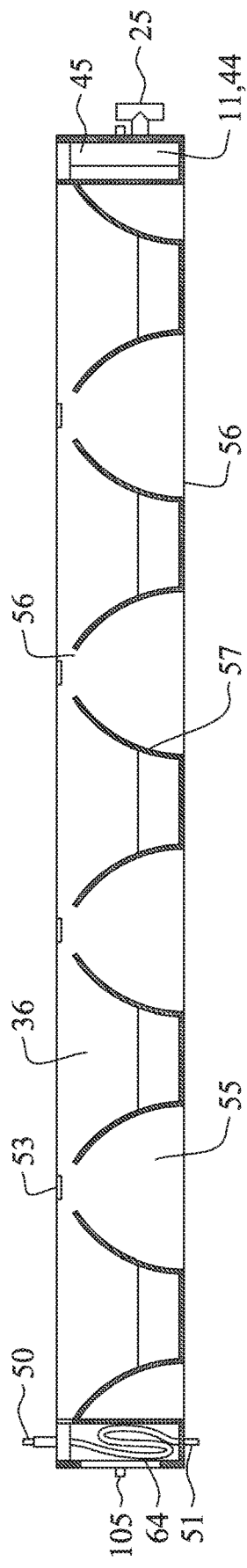
FIG. 5A is a section view of a magazine structure of an automated vertical plant cultivation system, in accordance with embodiments.
Figure 5B:
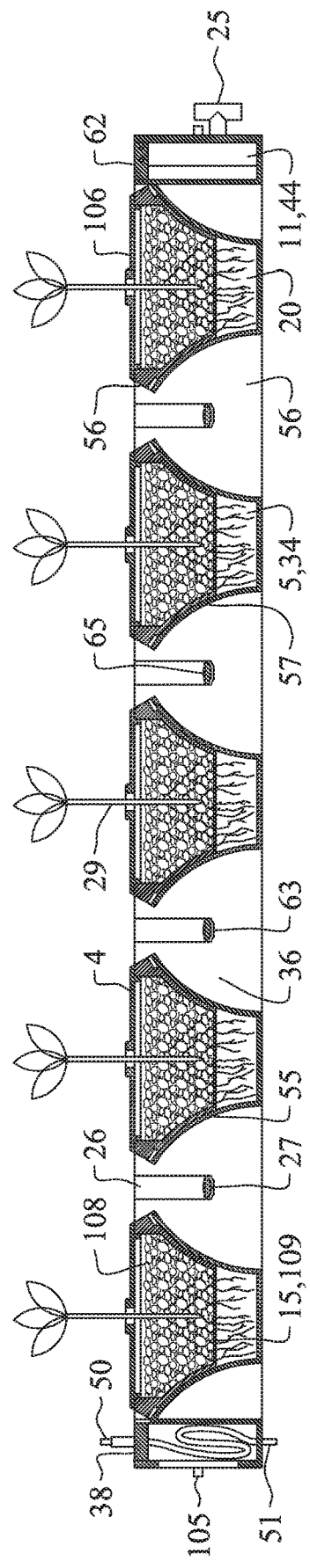
FIG. 5B is a section view of a magazine structure of an automated vertical plant cultivation system with plant/seed capsule, in accordance with embodiments.
Figure 5I:
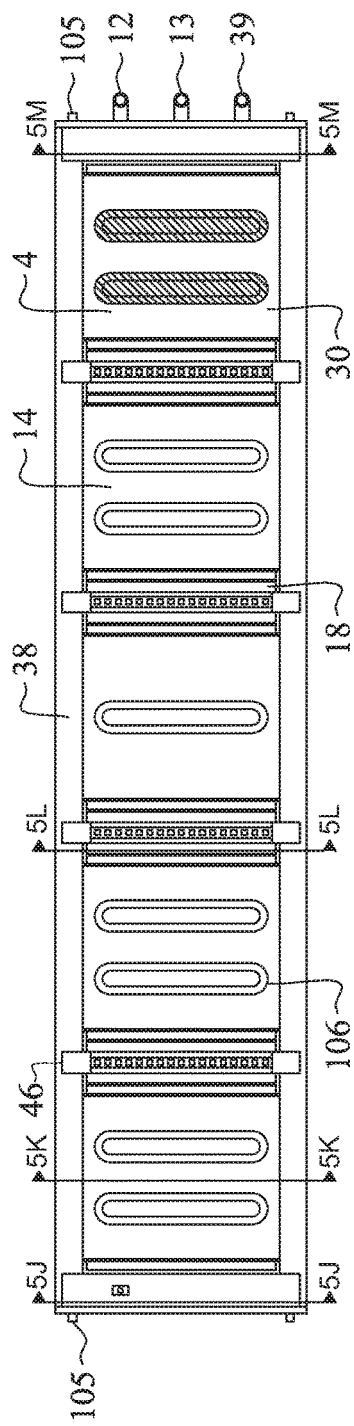
FIG. 5I is a top view of another magazine structure of an automated vertical plant cultivation system, in accordance with embodiments.
Figure 5K:
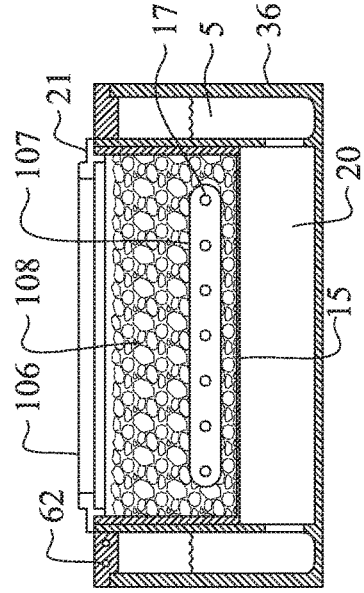
FIG. 5K is a section view of the magazine structure of FIG. 5I taken along line 5K-5K, in accordance with embodiments.
Figure 5M:
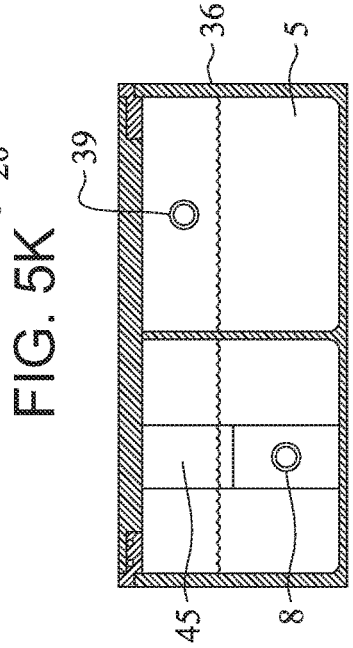
FIG. 5M is a section view of the magazine structure of FIG. 5I taken along line 5M-5M, in accordance with embodiments.
Figure 5J:
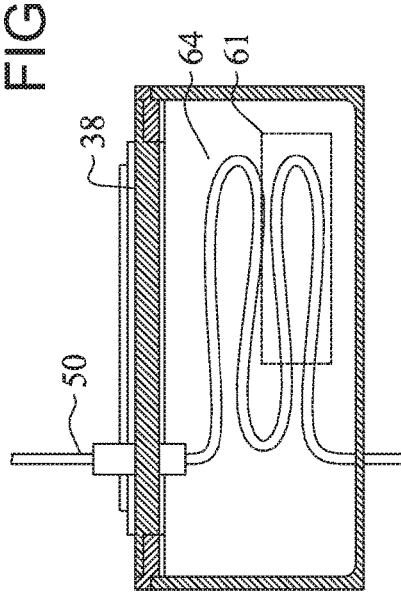
FIG. 5J is a section view of the magazine structure of FIG. 5I taken along line 5J-5J, in accordance with embodiments.
Figure 5L:
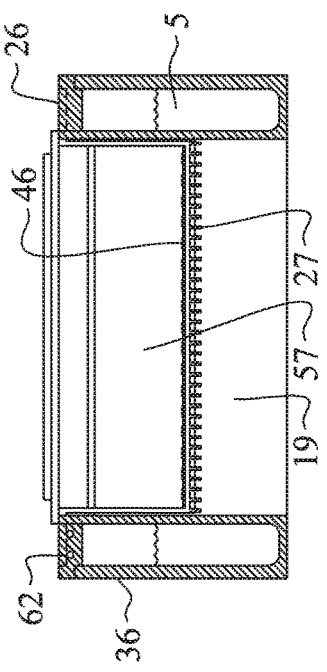
FIG. 5L is a section view of the magazine structure of FIG. 5I taken along line 5L-5L, in accordance with embodiments.
Figure 6D:
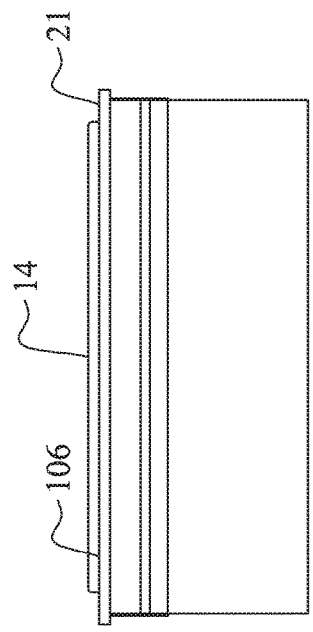
FIG. 6D is a side view of a seed/plant capsule for use in an automated vertical plant cultivation system, in accordance with embodiments.
Figure 6E:
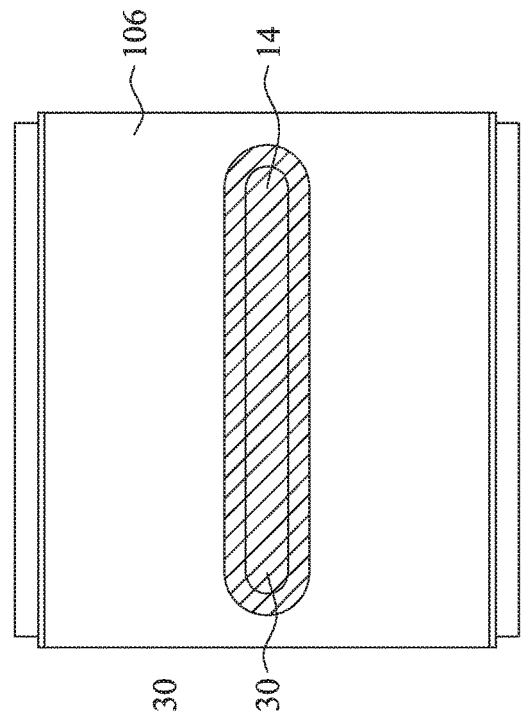
FIG. 6E is a top view of a seed/plant capsule for use in an automated vertical plant cultivation system, in accordance with embodiments.
Figure 6A:
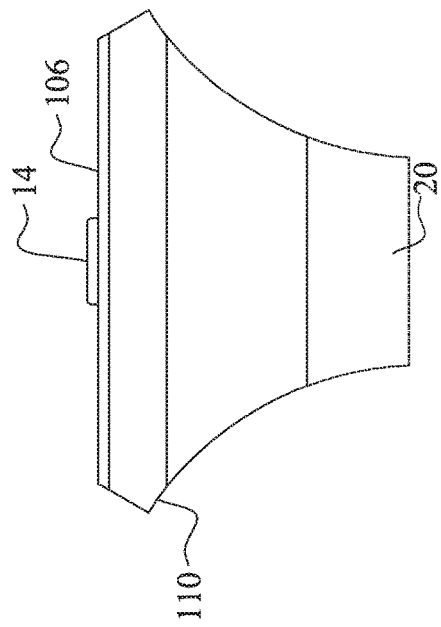
FIG. 6A is a side view of a seed/plant capsule for use in an automated vertical plant cultivation system, in accordance with embodiments.
Figure 6B:
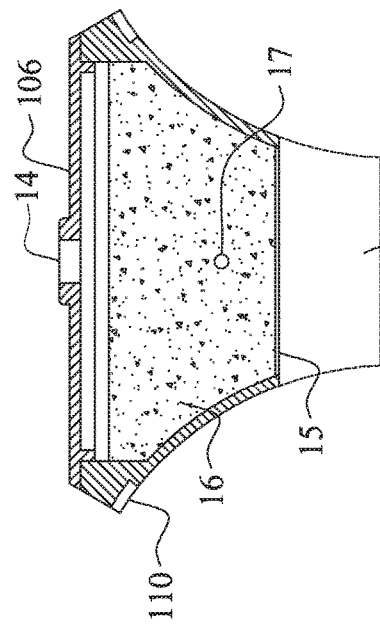
FIG. 6B is a section side view of a seed/plant capsule for use in an automated vertical plant cultivation system, in accordance with embodiments.
Figure 6C:
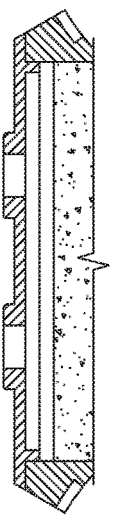
FIG. 6C is a section side view of a portion of a seed/plant capsule for use in an automated vertical plant cultivation system, in accordance with embodiments.
Figure 6I:
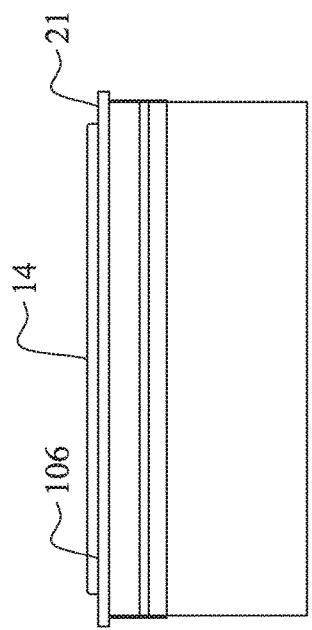
FIG. 6I is a side view of a hydroponics seed/plant capsule for use in an automated vertical plant cultivation system, in accordance with embodiments.
Figure 6J:
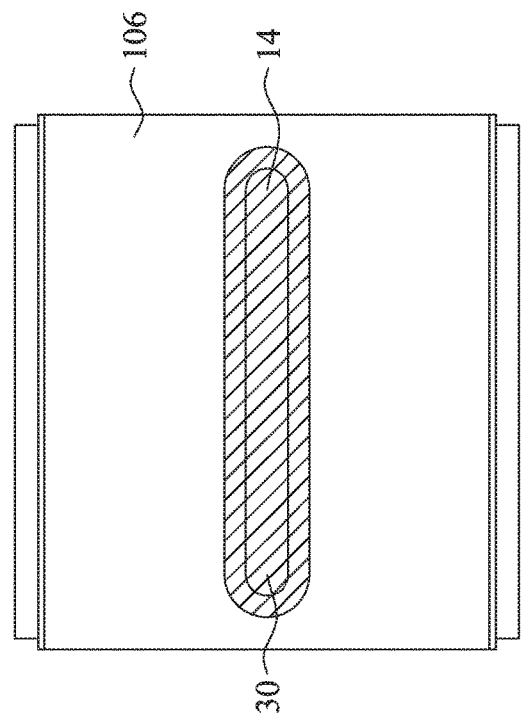
FIG. 6J is a top view of a hydroponics seed/plant capsule for use in an automated vertical plant cultivation system, in accordance with embodiments.
Figure 6F:
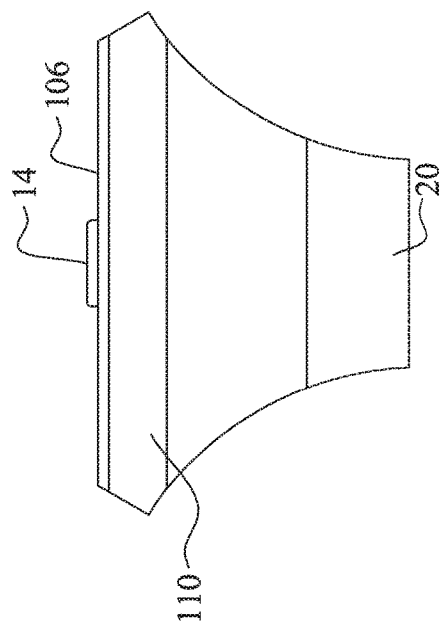
FIG. 6F is a side view of a hydroponics seed/plant capsule for use in an automated vertical plant cultivation system, in accordance with embodiments.
Figure 6G:
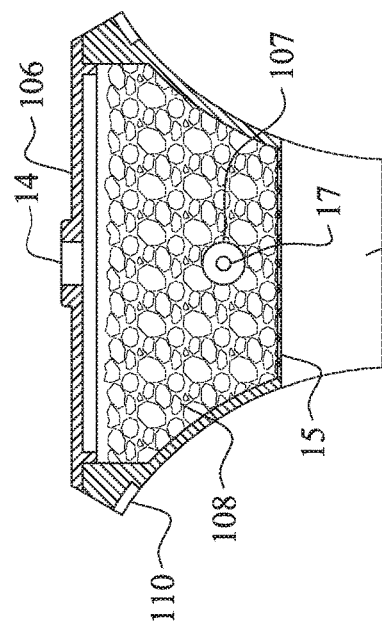
FIG. 6G is a section side view of a hydroponics seed/plant capsule for use in an automated vertical plant cultivation system, in accordance with embodiments.
Figure 6H:
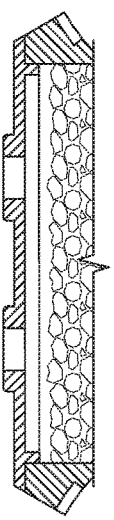
FIG. 6H is a section side view of a portion of a hydroponics seed/plant capsule for use in an automated vertical plant cultivation system, in accordance with embodiments.
Figure 9A:
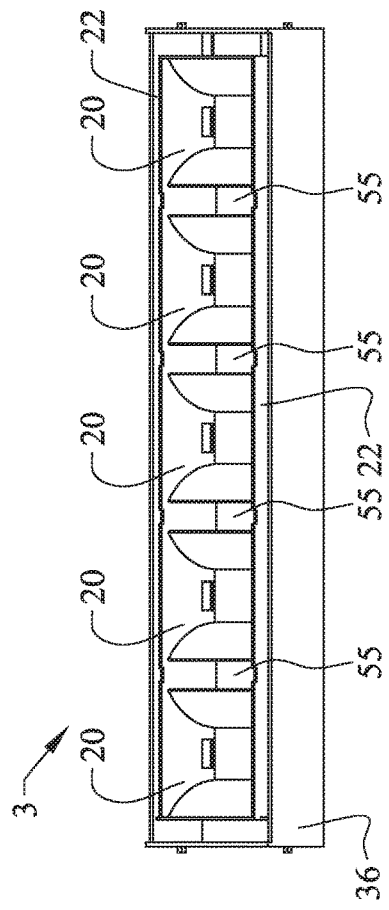
FIG. 9A is a perspective view of a magazine structure of an automated vertical plant cultivation system, in accordance with embodiments.
Figure 9B:
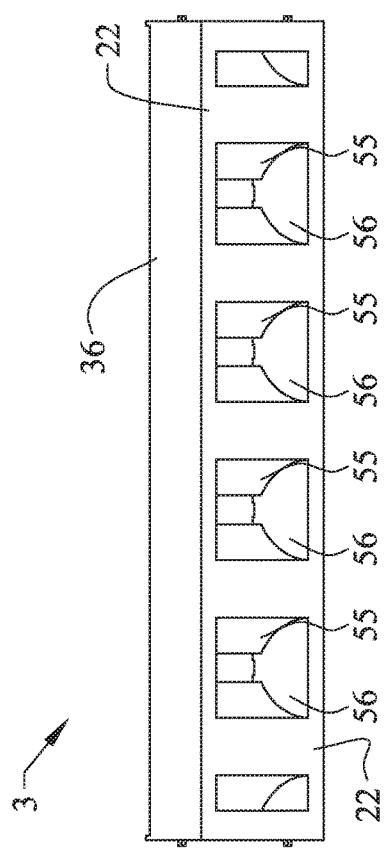
FIG. 9B is a perspective view of a magazine structure of an automated vertical plant cultivation system, in accordance with embodiments.
Figure 9C:
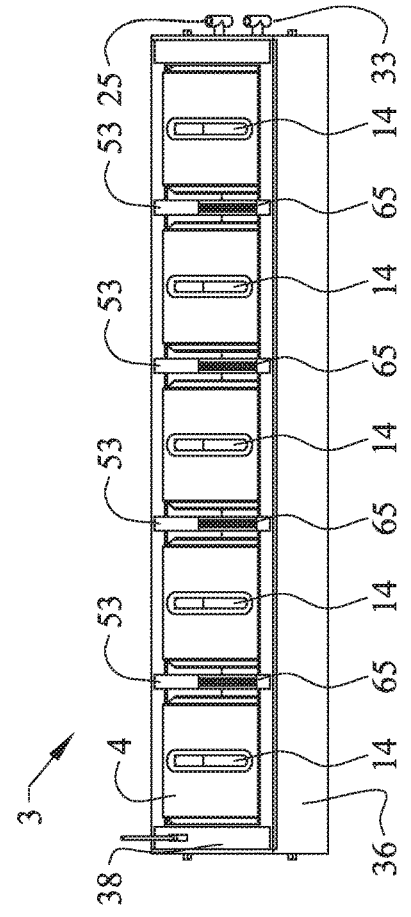
FIG. 9C is a perspective view of a magazine structure of an automated vertical plant cultivation system, in accordance with embodiments.
Figure 9D:
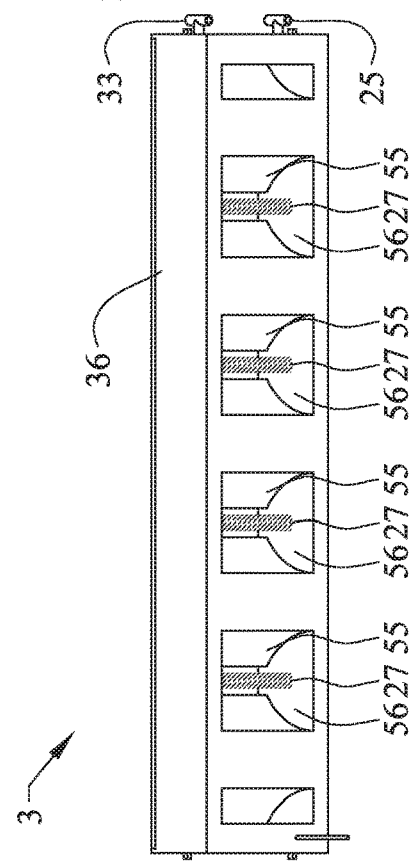
FIG. 9D is a perspective view of a magazine structure of an automated vertical plant cultivation system, in accordance with embodiments.
Figure 10C:
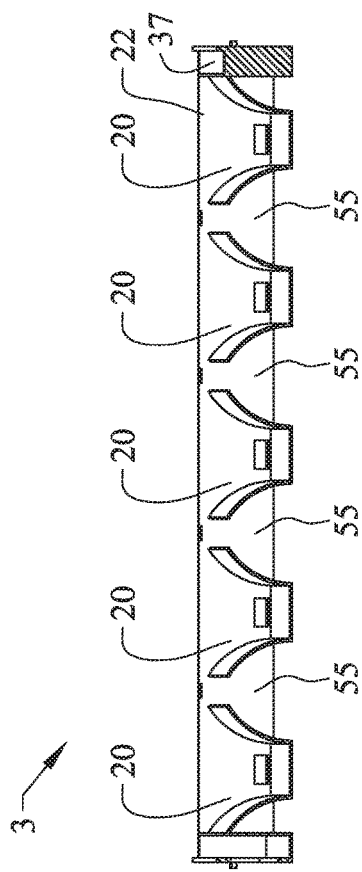
FIG. 10C is a section view of a magazine structure of an automated vertical plant cultivation system, in accordance with embodiments.
Figure 10D:
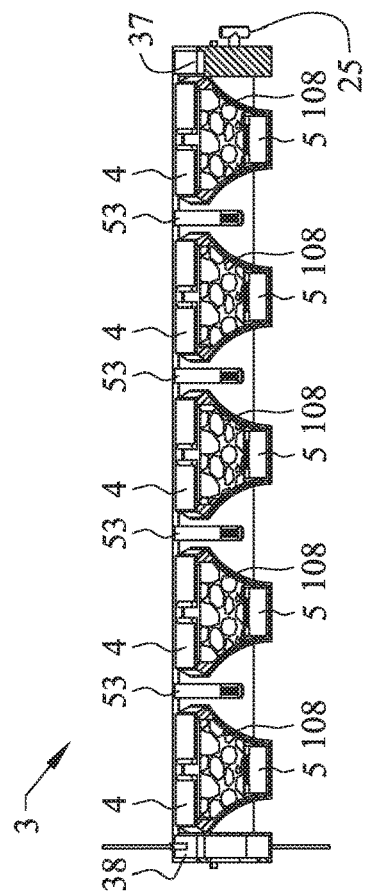
FIG. 10D is a section view of a magazine structure of an automated vertical plant cultivation system, in accordance with embodiments.
Figure 10A:
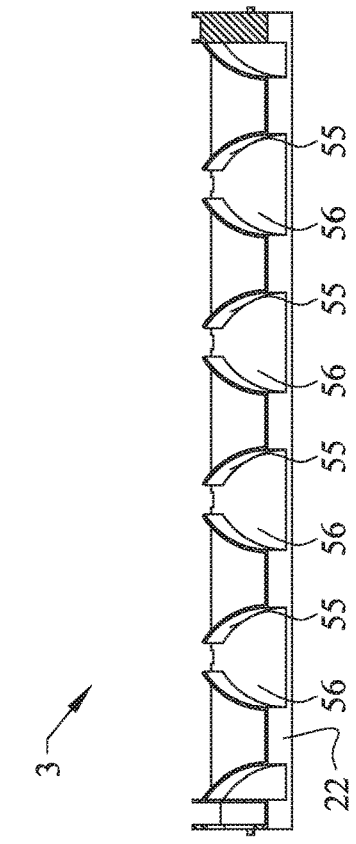
FIG. 10A is a section view of a magazine structure of an automated vertical plant cultivation system, in accordance with embodiments.
Figure 10B:
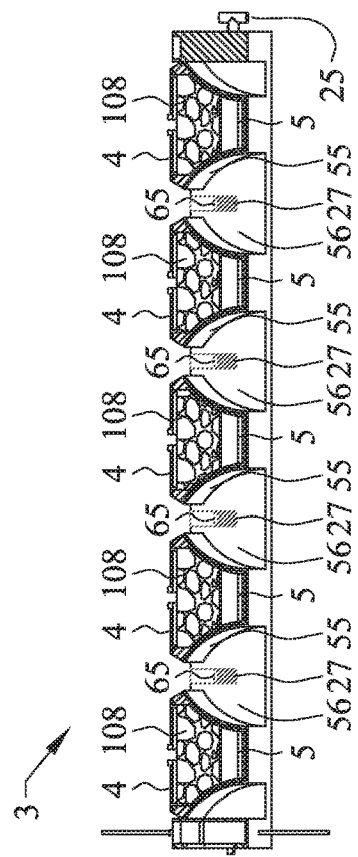
FIG. 10B is a section view of a magazine structure of an automated vertical plant cultivation system, in accordance with embodiments.

The plant/seed capsule (4) is an enclosure made of non-porous material with openings on top and on the bottom. The openings are sealed (110) to air and moisture and are removed prior to the capsule's deployment. The capsule contains one or several seeds of same or different plant (29) species. The seed (17) is embedded in a nutrient composite (16) and is suspended in scaffolding material (108) to enable root structure to establish a firm hold for the plant (29) once the seed (17) germinates. In hydroponic or aeroponic plant cultivation methods, the seed placement is different. FIGS. 5K, 6G and 6L show the seeds inside the plant/seed capsule placed in a sack (107) surrounded by scaffolding material absent nutrients. The production of the nutrient composite (16) employing non-hydroponic or non-aeroponic methods is tightly controlled to provide the correct balance of nutrients for the plant (29) species and protect from any life form including any in a dormant state. The production process reduces or removes moisture content in the composite and in some applications also removes air. At the bottom of the plant/seed capsule (4) for a capsule employing nutrient composite, a root membrane (15) permits fluid (5) to percolate into the capsule and upon seed (17) germination, allows the root system to penetrate the membrane (15) while containing the nutrient composite (16) inside the capsule. The plant/seed capsule (4) cap has a through sprout port through which the plant material sprouts. Some plant/seed capsules may come with several sprout openings. Upon inserting the capsule into the capsule's reservoir, a seal (110) surrounding the capsule's top wall prevents fluid/moisture infiltration.

System Structural Elements

The system is a load bearing assembly containing mechanical, electrical and plant material. FIG. 1A shows the key structural members. The assembly form is typically a square or rectangular. The structural members supporting the assembly include at least two vertical and two horizontal members at the assembly's periphery. The horizontal member at the bottom of the frame typically supports the pump (6), the holding/overflow tank (7), the control panel (41) and other electrical/electronic equipment. The horizontal member on top supports the gravity tank (9). The plant magazines (3) span across the vertical members latching onto them by adjustable fasteners (105). The adjustable fasteners free the magazine to travel vertically and be secured at the desired location. The magazines (3) are structurally rigid supplementing the assembly's overall structural strength. The vertical members may be opaque, or made of a see-through frame. Typically, the fluid's vertical circulatory pipe system travels along one end of the support member/s while the electrical/data vertical circulatory system travels along the other end. A wired or wireless interface panel can be placed on the vertical members' wall. The assembly design rating is for full loading and may include a rating capacity for suspended assemblies.

The plant seed and seedling capsules (4) are nestled inside the magazine's capsule vessels (20). The capsule (4) may be provided having one or several of the following features:
  A. A keyed mechanical connector to the magazine (3).
  B. A keyed electrical connector to the magazine (3).
  C. A keyed electromechanical connector to the magazine (3).
  D. A mechanical, electrical or electromechanical capsule identifier enabling the system processor to recognize the type and/or content of the plant capsule (4).
  E. A mechanical and/or an electronic means to associate the location of a specific plant capsule (4) with the plant vessel cavity in the magazine (3).

F. A mechanical and/or an electronic means to initiate an activation of a plant capsule (4).

G. At least one seal sealing the magazine (3) content from contact with the exterior environment until ready to be activated.

H. A means to keep track of a capsule's (4) operational time from the moment of activation.

I. A nutrient/s enrichment capsule contained in the plant capsule (4) that enriches plant material which can be dispensed using a time-release mechanism. The capsule can be detachable and replaceable.

J. Anti-fungal, bacteria and/or undesirable odor antiseptic capsule/s (4) that can be dispensed using a time-release mechanism. The capsule (4) can be detachable and replaceable.

Operation of the system (200) activates the plant capsule (4). Upon plant capsule activation, the system's (200) processor becomes aware of the capsule's (4) plant growth cycle. In so doing, it provides optimal nurturing to the plant. The level of care is contingent on the sophistication level of embodiments of the system (200). For example, and without limitation, a plant capsule (4) may contain at least one valve that, through the system's (200) processor, controls the amount of fluid entering into the plant capsule vessel (20) and the duration of how long the fluid remains there. The processor may inform the user about the plant growth cycle, alert when sensing anomalies, and suggest how the plant material can be used when it becomes edible. The processor, if permitted, may also be communicatively coupled to a device in a remote location, engaging the user with suggestions, promotions and chat rooms of other system (200) users. Further, the system may include a dehumidifier in order to ensure that the optimal humidity for particular plants as identified from the keyed capsule to optimize the growth cycle of that particular plant.

The plant capsule (4) size and shape may vary, as well as its plant aperture size and number of its cap openings. The capsule (4) can be fabricated for a one-time use, or can employ a removable cap for multiple uses. A multiple use capsule (4) may enable the replacement of spent plant material with new seed sacks or seedling bundles upon completion of a plant growth cycle. Operable replenished capsules (4) may be provided on a subscription basis where the processor can reset the capsule for a new growth cycle. Similarly, when the unauthorized use of a capsule (4) is detected, the processor may de-activate the capsule's (4) optimization of the plant growth cycle. Under authorized use, plant material inside the capsule (4) receives the optimal amount of fluid, nutrition, and light at the correct spectral wavelength and duration. In addition, sensing devices may be used or a part of the system (200) and in communication with the processor wherein the processor can monitor, alert, and act on invading pests and identify unhealthy changes in the plant foliage in response to information and data provided by the sensing devices.

Additional embodiments may include a miniaturized flying device or drone that may under control or autonomously fly over the system (200) and the plant material, sense blooming flowers and then pollinate the blooming flowers. Additionally, the miniaturized flying device or drone may also sense anomalies in plant foliage and communicate its finding to the processor as it flies over the system (200) and the plant material.

The embodiments and examples set forth herein were presented in order to best explain the present invention and its practical application and to thereby enable those of ordinary skill in the art to make and use the invention.

However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A plant cultivation system comprising:
   at least one magazine for retaining at least one seed or plant capsule, a lighting device, and a fluid circulation system;
   a number of capsule reservoirs each including a perimeter wall defining a top opening along a top face of the at least one magazine, the top opening facing upwards, each of the capsule reservoirs configured to receive the at least one seed or plant capsule exposed to atmosphere through the top opening;
   at least one reflector having an aperture facing downward at a bottom face of the at least one magazine, the at least one reflector substantially concealing the lighting device from direct viewing, wherein the number of capsule reservoirs includes two capsule reservoirs, each of the two capsule reservoirs arranged adjacent to the reflector on opposite sides thereof such that the reflector divides the two capsule reservoirs and their respective top openings from each other along a horizontal axis of the at least one magazine;
   at least one pair of vertical walls and a common bottom surface forming a fluid channel, the fluid channel extending alongside the number of capsule reservoirs and the at least one reflector aperture of the magazine;
   and wherein the fluid circulation system is configured to flow fluid into and/or out of the number of capsule reservoirs for hydrating the at least one seed or plant capsule.

2. The system of claim 1, wherein the lighting device is arranged to direct light downward through the aperture, wherein the at least one reflector defines an opening in an apex of the reflector and the lighting device is arranged to direct light upward through the opening.

3. The system of claim 1, wherein the lighting device is detachable.

4. The system of claim 1, further comprising a controller configured to modulate the lighting device's spectral distribution.

5. The system of claim 1, wherein the reflector opening enables air to flow from a bottom to a top of the magazine thereby cooling the lighting device and eliminating heat stratification.

6. The system of claim 1, wherein a wall of the reflector is an exterior wall of one of the upward facing capsule reservoirs.

7. The system of claim 1, wherein the magazine is configured to support its weight, the at least one seed or plant capsule, fluid flowing into the magazine, and the at least one lighting device from at least one end support.

8. The system of claim 1, wherein a fluid channel cover retains power conductors, data conductors or power and data conductors.

9. The system of claim 1, further comprising a fluid sensor, a microvalve controlling fluid flow into the magazine, a communication module and an assembly control, wherein the assembly control controls operation of the microvalve to maintain a pre-set fluid level in the fluid channel of the magazine based on data from the fluid sensor.

10. The system according to claim 9, wherein the assembly control is configured to include at least one of:
   A. Managing a synchronized operation of lighting devices,
   B. Monitoring lighting devices and creating data sets if required,
   C. Alerting user when an assembly device experiences an anomaly,
   D. Facilitating back-up power connectivity when experiencing a power shortage by means of a back-up power module,
   E. Providing diagnostics and troubleshooting reports, and
   F. Monitoring ambient conditions including assembly fluid temperature by means of the moisture/fluid level sensor.

11. The system of claim 9, wherein the fluid egressing the magazine is filtered and re-circulated back into the at least one magazine.

12. The system of claim 9, further comprising plant nutrients incorporated into the fluid circulatory system.

13. The system of claim 9, wherein the system is configured to activate the seed or plant capsule when the system is in operation, wherein a processor of the system is configured to become aware of the capsule's growth cycle, and wherein the plant capsule comprises at least one valve, the valve being configured to control, through the system's processor, an amount of fluid entering into the plant capsule reservoir and the duration of how long the fluid remain there.

14. The system of claim 1, wherein the perimeter wall of each capsule reservoir abuts with the reflector to define a terminal boundary of the reservoir.

15. The system of claim 1, wherein the fluid channel surrounds the capsule reservoirs.

16. The system of claim 15, wherein the fluid channel is defined at least partly by the perimeter wall of the capsule reservoirs.

17. The system of claim 1, wherein the lighting device is arranged to direct light in at least one of (i) downward through the aperture, and (ii) upward through an opening defined in an apex of the reflector.

18. A method of using a plant cultivation system, the method comprising:
   providing the plant cultivation system, said plant cultivation system comprising:
      at least one magazine for retaining at least one seed or plant capsule, a lighting device, and a fluid circulation system;
      a number of capsule reservoirs each including a perimeter wall defining a top opening along a top face of the at least one magazine, the top opening facing upwards, each of the capsule reservoirs configured to receive the at least one seed or plant capsule exposed to atmosphere through the top opening;
      at least one reflector having an aperture facing downward at a bottom face of the at least one magazine, the at least one reflector substantially concealing the lighting device from direct viewing, wherein the number of capsule reservoirs includes two capsule reservoirs, each of the two capsule reservoirs arranged adjacent to the reflector on opposite sides thereof such that the reflector divides the two capsule reservoirs and their respective top openings from each other along a horizontal axis of the at least one magazine;
      at least one pair of vertical walls and a common bottom surface forming a fluid channel, the fluid channel extending alongside the number of capsule reservoirs and the at least one reflector aperture of the magazine; and
   flowing fluid into and/or out of at least one of the capsule reservoirs via the fluid circulation system to hydrate the at least one seed or plant capsule.

* * * * *